(12) United States Patent
Lindblom et al.

(10) Patent No.: US 7,054,263 B1
(45) Date of Patent: May 30, 2006

(54) SYNCHRONOUS CHANGE OF SWITCHPLANE

(75) Inventors: Mats Lindblom, Johanneshov (SE); Hans Berghager, Älvsjö (SE); Per Sydhoff, Stockholm (SE); Mikael Kundel, Årsta (SE); Astrid Berglund, Skarpnäck (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 852 days.

(21) Appl. No.: 09/688,152

(22) Filed: Oct. 16, 2000

(51) Int. Cl.
G01R 31/08 (2006.01)
(52) U.S. Cl. .................... 370/219; 370/241.1
(58) Field of Classification Search ........ 370/216–220, 370/241.14, 244, 255, 228, 395.2, 236.2, 370/222, 223, 224, 248, 249, 236, 236.1, 370/241.1; 340/2.23; 714/2
See application file for complete search history.

(56) References Cited

U.S. PATENT DOCUMENTS

| | | | | |
|---|---|---|---|---|
| 4,901,309 A | * | 2/1990 | Turner ........................ | 370/387 |
| 5,128,926 A | * | 7/1992 | Perlman et al. ............. | 370/248 |
| 5,229,991 A | * | 7/1993 | Turner ........................ | 370/389 |
| 5,268,897 A | * | 12/1993 | Komine et al. ............. | 370/400 |
| 5,283,782 A | * | 2/1994 | Takase et al. ................ | 370/219 |
| 5,321,688 A | * | 6/1994 | Nakano et al. .............. | 370/244 |
| 5,398,235 A | | 3/1995 | Tsuzuki et al. | |
| 5,488,606 A | * | 1/1996 | Kakuma et al. ............. | 370/219 |
| 5,663,949 A | * | 9/1997 | Ishibashi et al. ............ | 370/220 |
| 5,848,227 A | * | 12/1998 | Sheu ............................. | 714/4 |
| 5,909,427 A | * | 6/1999 | Manning et al. ............. | 370/219 |
| 6,075,767 A | * | 6/2000 | Sakamoto et al. .......... | 370/228 |
| 6,359,858 B1 | * | 3/2002 | Smith et al. ................. | 370/217 |
| 6,411,599 B1 | * | 6/2002 | Blanc et al. ................ | 370/219 |
| 6,477,141 B1 | * | 11/2002 | Izawa et al. ................ | 370/219 |
| 6,487,169 B1 | * | 11/2002 | Tada ........................... | 370/219 |
| 6,735,173 B1 | * | 5/2004 | Lenoski et al. ............. | 370/235 |

FOREIGN PATENT DOCUMENTS

| WO | 98/26611 | 6/1998 |
|---|---|---|
| WO | WO 9826611 A2 * | 6/1998 |

OTHER PUBLICATIONS

International Preliminary Examination Report mailed Jan. 21, 2003 in corresponding PCT Application No. PCT/SE01/02255.
US 5,361,257, 11/1994, Petersen (withdrawn)

* cited by examiner

Primary Examiner—Bob Phunkulh
Assistant Examiner—Ian N. Moore
(74) Attorney, Agent, or Firm—Nixon & Vanderhye, P.C.

(57) ABSTRACT

A change of switch plane operation is performed in a multi-plane cell switching node (20) which has a first switch plane (22); a second switch plane (24); and plural switch port interface units (26). In response to detection of a fault in the active switch plane, the passive switch plane sends a plane change cell to the plural switch port interface units, and stops egress traffic flow from the second switch plane. Upon receiving the plane change cell, each switch port interface unit redirects traffic cells sent from the active plane to the passive switch plane. Each switch port interface unit then determines when traffic cells destined thereto have been flushed from the first switch plane, and changes its active switch plane designation (so that the formerly passive switch plane becomes the active switch plane) so that egress traffic flow can begin from the formerly passive (now active) plane to the respective switch port interface units.

22 Claims, 16 Drawing Sheets

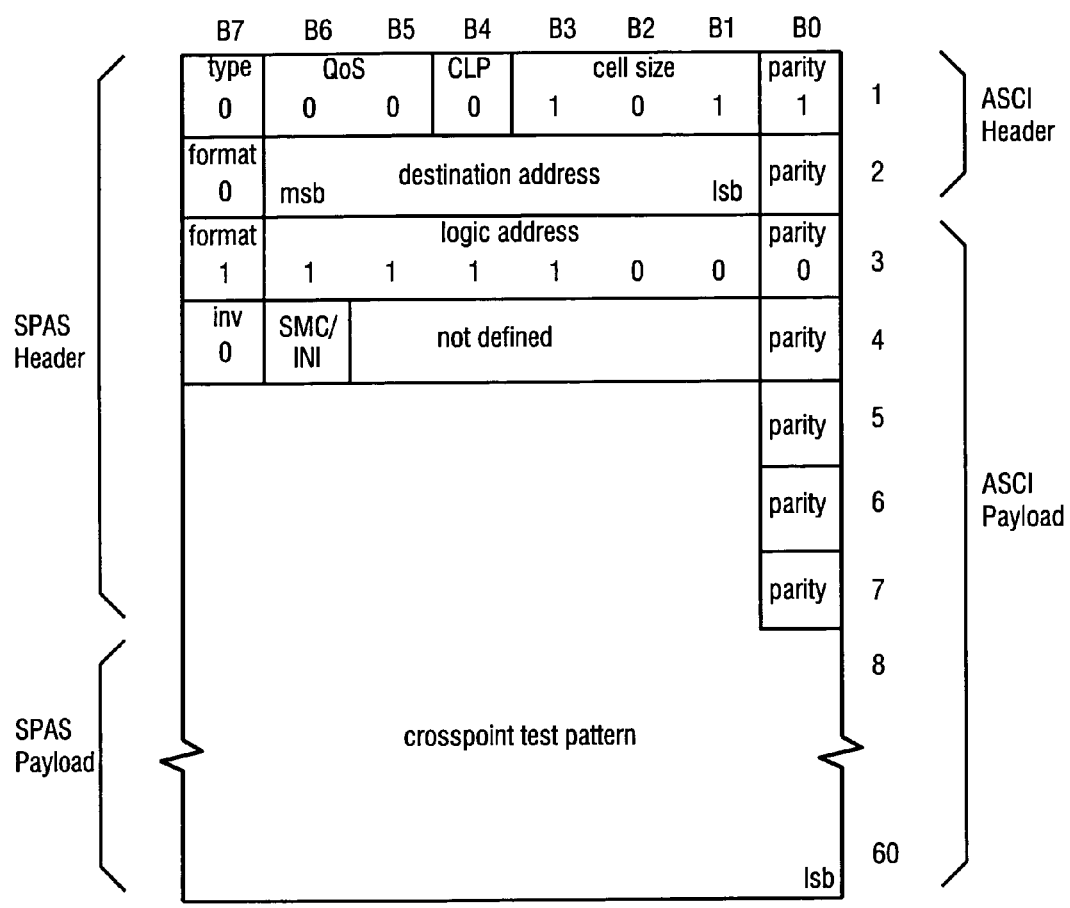
Fig. 4B(1)   Initialisation Cell

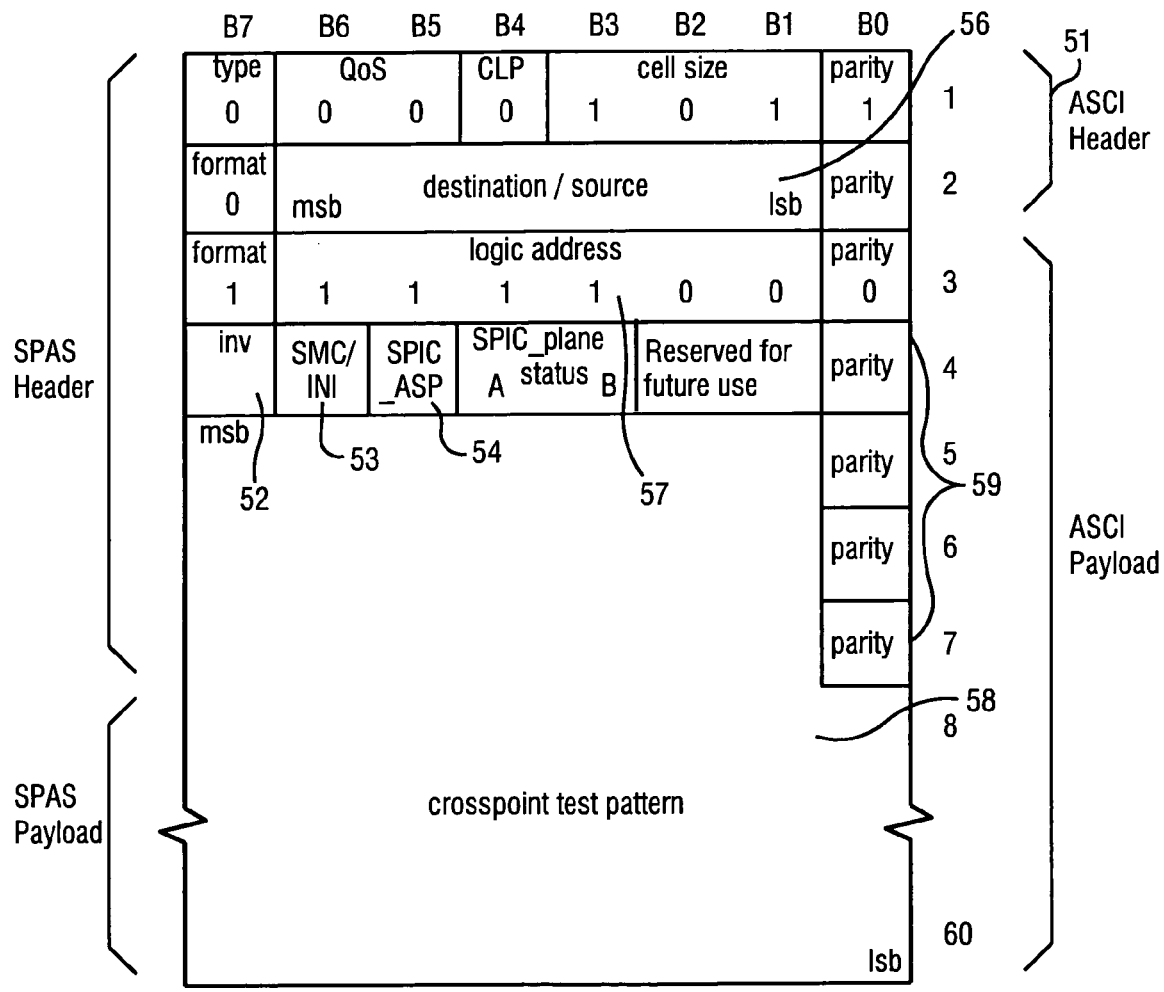
Fig. 4B(2)    Switch Maintenance Cell

SYNCHRONOUS CHANGE OF SWITCHPLANE

This application is related to simultaneously filed U.S. patent application Ser. No. 09/688,165, entitled "FAULT DETECTION IN MULTI-PLANE SWITCH", which is incorporated herein by reference in its entirety.

BACKGROUND

1. Field of the Invention

The present invention pertains to cell switches, and particularly to cell switches which operate with plural switch planes.

2. Related Art and Other Considerations

Cell switches, such as ATM cell switches or Internet Protocol (IP) routers, are extensively employed in communication systems, such as mobile telecommunication systems, for example. Typically a communication node with a cell switch has a switch core which routes an incoming cell from an ingress port of the core to one or more egress ports of the core. The core ports are connected to respective switch port interface units (SPICs). In some systems, the switch port interface units reside on a board, with the board also having a board processor (BP) and (usually) other devices situated thereon. Some of the boards can be, for example, exchange terminals (ETs) which connect to links leading to other nodes of the network (e.g., other cell switches). One of the boards may have a main processor (MP) which governs the operation of the cell switch node.

Usually, when a traffic cell is received at cell switching node it is received at an extension board. The header of the incoming traffic cell is analyzed and manipulated at the extension board in order to route at least the payload of the cell through the cell switch. Various activities are performed at the switch port interface unit of the board, including queuing of the traffic cell in an appropriate buffer of the switch port interface unit in accordance with its priority and destination switch port interface unit of the node. When the traffic cell is selected for dequeuing from its switch port interface unit, it is transmitted over a link to the corresponding ingress port of the core. Typically in the switch core itself the traffic cell is again queued in accordance with its destination switch port interface unit, and read out of the core queue at an appropriate time through the egress core port to the destination switch port interface unit.

For redundancy cell switching nodes typically operate with plural switch planes. Each of the plural switch planes has a switch core. Traffic cells are usually sent from the ingress switch port interface unit to the egress switch port interface unit through an active one of the plural switch planes. An example of an ATM cell switch with plural switch planes is disclosed in U.S. patent application Ser. No. 09/134,358 filed Apr. 14, 1998 by Wicklund, entitled "Cell Selection for ATM Switch Having Redundant Switch Planes", which is incorporated herein by reference.

When the active switch plane develops a problem, traffic cells are instead routed through one of the redundant switch planes. Detection of an failure of the active switch plane can be problematic. Moreover, change over from the failed plane (which is to no longer serve as the active plane) to a redundant plane (which becomes the active plane) can be complex and liable to cell loss.

One conventional method of detecting failure of a switch plane is to permit the switch port interface units to communicate with one another via handshaking packets or the like. As long as successful bidirectional handshaking occurs, it is presumed that there is full connectivity through the active switch plane, and therefore that the switch plane is error free. But such handshaking technique unwisely assumes that there is always a switch port interface unit connected to a particular egress port of the switch core. Such assumption may not be correct, as the egress port of the core may be open for future use. Moreover, the switch port interface units may operate a different transmission rates, as can occur when switch port interface units at the same switching node are of differing grades or of differing generations. If the switch port interface units operate at different transmission rates in a handshaking scenario, care must be taken to adjust the times of the handshaking packets, lest there be a timeout or failure to receive a sent handshaking packet. The timing considerations to protect against such a possibility introduce complex and awkward implementations of the handshaking procedures.

What is needed, therefore, and an object of the present invention, is an efficient and simple technique for detecting failure of a switch plane in a multi-plane cell switch. An advantage of the present invention is a technique for (upon detection of switch plane failure) transferring all traffic cells to a redundant plane without losing, corrupting, or confusing the order of the traffic cells.

BRIEF SUMMARY OF THE INVENTION

A change of switch plane operation is performed in a multi-plane cell switching node which has a first switch plane; a second switch plane; and plural switch port interface units. In response to detection of a fault in the active switch plane, the passive switch plane sends a plane change cell to the plural switch port interface units, and stops egress traffic flow from the second switch plane. Upon receiving the plane change cell, each switch port interface unit redirects traffic cells sent from the active plane to the passive switch plane. Each switch port interface unit then determines when traffic cells destined thereto have been flushed from the first switch plane, and changes its active switch plane designation (so that the formerly passive switch plane becomes the active switch plane) so that egress traffic flow can begin from the formerly passive (now active) plane to the respective switch port interface units.

Preferably the detection of the fault in the active switch plane is performed by one of the switch port interface units. The fault-detecting switch port interface unit sends a fault detection cell to the passive switch plane. In response to the receipt of the fault detection cell, the second switch plane sends a broadcast plane change signal to plural cell receiving units (RCUs) of the second switch plane. The plural cell receiving units correspond to the plural switch port interface units. The plural cell receiving units generate the plane change cells for sending to the respective plural switch port interface units.

A particular switch port interface unit determines when traffic cells destined to the particular switch port interface unit have been flushed from the first switch plane by (1) sending a first type of predetermined non-traffic cells to the first switch plane; and (2) in accordance with receipt of the first predetermined non-traffic cells via the first switch plane at a particular switch port interface unit, sending a second predetermined non-traffic cell from the particular switch port interface unit to the second switch plane. The egress traffic flow from the second switch plane to the particular switch port interface unit is started upon reception of the second predetermined non-traffic cell from the particular switch port interface unit at the second switch plane. The first predetermined non-traffic cells are preferably synchronization cells; the second predetermined non-traffic cell is preferably a management cell.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4B(2)(1) is an example format for an initialization cell of the present invention.

FIG. 4B(2) is an example format for a maintenance cell of the present invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
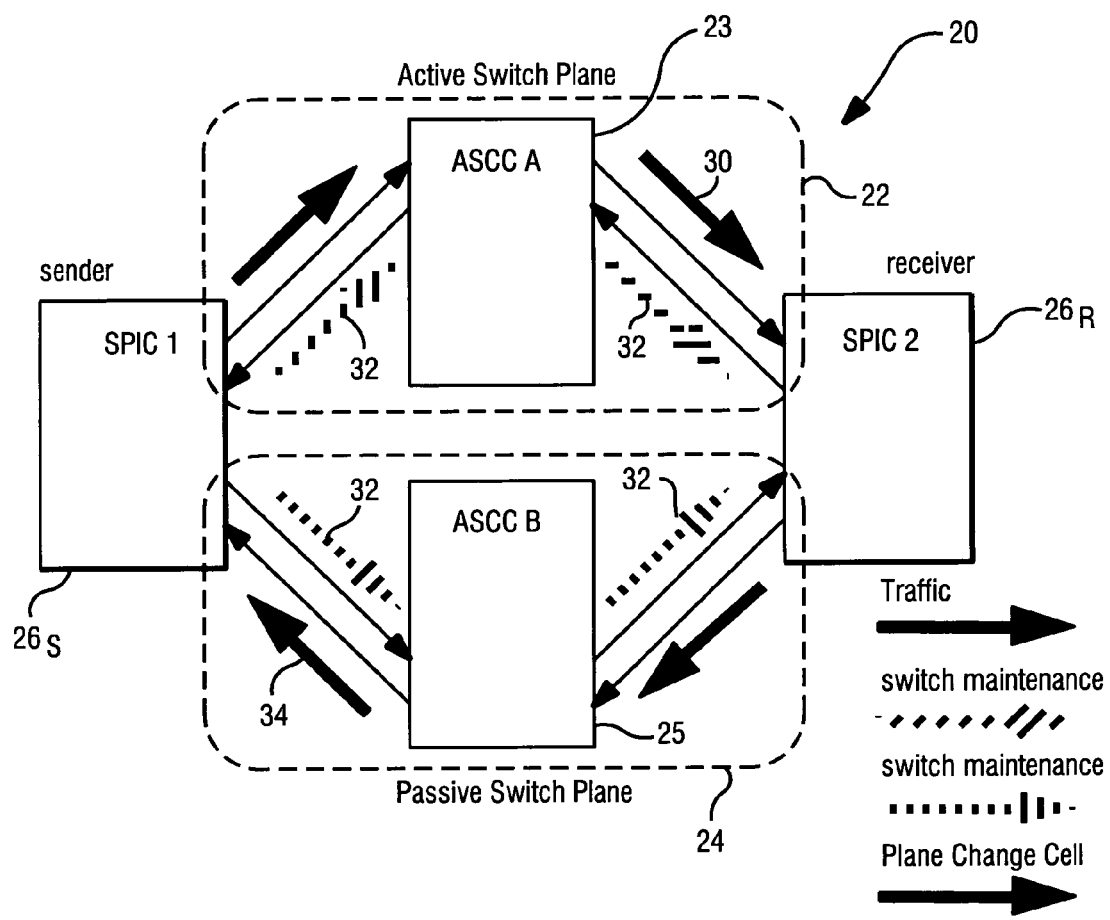
FIG. 1 is a schematic view of portions of a multi-plane cell switching node according to an embodiment of the invention.

FIG. 1 illustrates an example switching node 20 of an embodiment of the invention. The switching node 20 comprise any type of cell switch, such as (for example), an ATM cell switch or an Internet Protocol (IP) router. The switching node 20 includes a first switch plane 22 (having a first plane switch core 23); second switch plane 24 (having a second plane switch core 25); sender switch port interface unit (SPIC) $26_S$; and receiver switch port interface unit (SPIC) $26_R$. In general, the sender switch port interface unit (SPIC) 26 sends traffic cells through one of the switch planes 22, 24 to the receiver switch port interface unit (SPIC) 26. The particular switch plane through which traffic cells (e.g., cells with user data) are routed is considered to be the active switch plane. The other switch plane is referred to as the passive switch plane and, as described herein, provides redundancy in the event of failure of the active switch plane. All switch port interface units have the same switch plane defined as the active switch plane.

Figure 11A:
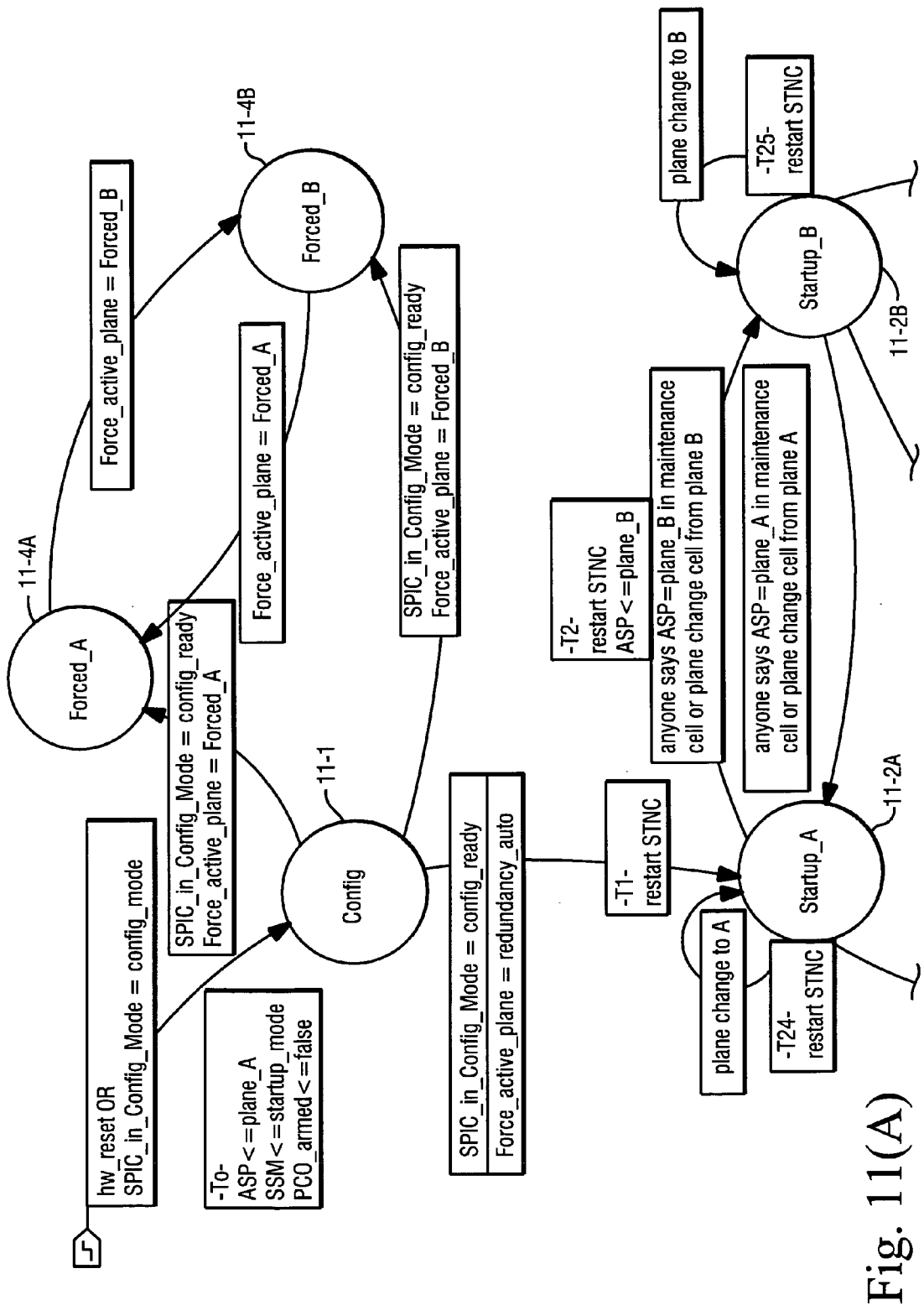
FIG. 11 is a diagrammatic view showing basic modes of a switch port interface unit.
Figure 11B:
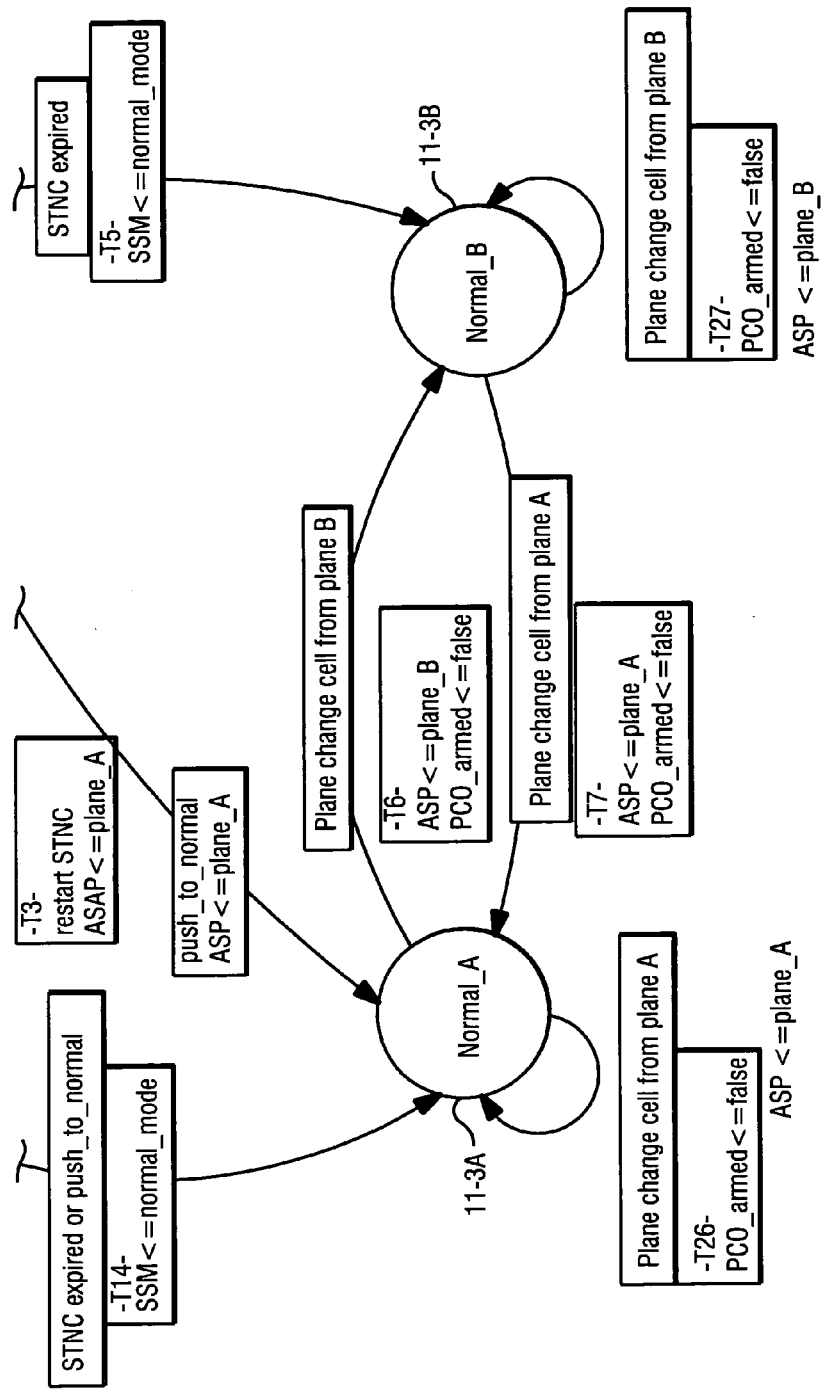

From a redundancy perspective, the switch port interface units (SPIC) 26 have various modes of operation as illustrated in FIG. 11. These modes, described in more detail subsequently, include the configuration mode 11-1; start-up_A mode 11-2A (for first switch plane 22); start-up_B mode 11-2B (for second switch plane 24); normal_A mode 11-3A (for first switch plane 22); normal_B mode 11-3B (for second switch plane 24), forced_A mode 11-4A (for first switch plane 22); and forced_B mode 11-4B (for second switch plane 22).

At the particular moment shown in FIG. 1, first switch plane 22 is considered to be an active switch plane, while second switch plane 24 is considered to be a passive switch plane. At any moment of operation, traffic cells flow only through whichever switch plane is currently the active plane (as depicted by arrows 30 through first switch plane 22 serving as the active switch plane). Any traffic cells received at the switch plane currently serving as the passive switch plane are discarded.

In addition to traffic cells, the switching node 20 of the present invention also utilizes the following cell types: initialization cells, management cells; maintenance cells; and plane change cells. Management cells (used, e.g., to control the switch cores 23, 25) can be directed to either of first the active switch plane or the passive switch plane. The maintenance cells are employed to detect a failed switch plane, and also can travel through both the active switch plane and the passive switch plane 24 as indicated by arrows 32 in FIG. 1. The plane change cells typically only travel through the passive switch plane, as shown by arrows 34 in FIG. 1.

The switching node 20 has four major error detection scenarios. The first error detection scenario occurs when the Access Multiplexer Switch Core Interface (ASCI) ingress goes out of synchronization, as detected by the Acess Multiplexer Switch Core Circuit (ASCC) and reported to switch port interface unit (SPIC) 26. The second error detection scenario involves the ASCI going out of synchronization (as detected by switch port interface unit (SPIC)26). A third error detection scenario is occurrence of a parity error in certain cells in the link from the ASCC to switch port interface unit (SPIC) 26 which are detected by the switch port interface unit (SPIC) 26 (e.g., the SPAS transfer list for traffic cells, in ASCU management cells, and switch maintenance cells). A fourth error detection scenario involves lost or corrupted switch maintenance cells. The fourth of the error detection scenarios, i.e., fault detection using maintenance cells, is discussed separately below.

If any of the four above-summarized error detection scenarios occurs in the active switch plane, then the switch port interface unit (SPIC) 26 which detects the error considers the plane to be erroneous. As explained in more detail below, the switch port interface unit (SPIC) 26 which detected the error will, when appropriate conditions are satisfied, immediately order every switch port interface unit (SPIC) 26 in the switching node 20 to change its designation of active switch plane. If any one of the above error scenarios is detected in the passive switch plane, the error will be noted in a corresponding error register/counter, and the right to initiate a plane change will be withdrawn.

Initialization and Maintenance Cells

A switch port interface unit (SPIC) 26 generates non-traffic cells internally that are sent to every switch port interface unit (SPIC) 26 (e.g., all sixty four switch ports in a sixty four switch port embodiment). The initialization cells are sent to reset the supervising mechanism in the receiving switch port interface unit (SPIC) 26 and to synchronize the switch ports cross-point status with the sending switch port interface unit's (SPIC) cross point information. The initialization cells are only sent during start-up. After start up there is an automatic change of initialization cells to maintenance cells. An example format of an initialization cell is illustrated in FIG. 4B(1).

Whereas synchronization error checking and parity error checking cover only errors in the interface between one switch port interface unit (SPIC) 26 and its corresponding part in the ASCC, switch maintenance cells are used to detect errors in the complete path between one switch port interface unit (SPIC) 26 and another switch port interface unit (SPIC) 26. An example format of switch maintenance cell is illustrated in FIG. 4B(2). As explained subsequently, to check the cross point buffers in the switch ports for stuck-at-zero or stuck-at-one faults, every other cell to a plane has its payload bit pattern inverted. The switch maintenance cells are also used to spread information about what planes a switch port interface unit (SPIC) 26 considers to be erroneous and which plane the switch port interface unit (SPIC) 26 considers as its active plane.

Concerning the format of the initialization cell (FIG. 4B(1)) and the format of the switch maintenance cell (FIG. 4B(2)), in the ingress direction the field "destination/source address" contains the destination address. In the egress direction, this field contains the source address. The logic address "111100" indicates that the cell is a switch maintenance cell or an initialization cell. The field "inv" reveals whether the payload pattern is inverted or not (e.g., 0=inverted; 1=not inverted). The SMC/INI field are used to designate the cell as a switch maintenance cell or an initialization cell. That is, if the SMC/INI field has the value "0", the cell is a switch maintenance cell, but if the SMC/INI field has the value "1", the cell is an initialization cell. The field SPIC_ASP indicates whether the plane which the cell through which the cell is to be passed is considered an active plane or a passive plane (the field SPIC_ASP set to zero indicates an active plane; the field SPIC_ASP set to one indicates a passive plane). A bit set to one in the SPIC_plane_status bit indicates that the switch port interface unit (SPIC) 26 considers the corresponding switch plane as faulty.

Fault Detection Using Maintenance Cells

In switching node 20, each switch port interface unit $26_S$ serves as a sender switch port interface unit (SPIC) 26 to send switch maintenance cells to all corresponding cross points in first switch plane 22 and to all corresponding crosspoints in second switch plane 24. As explained subsequently, these switch maintenance cells are applied to the first switch plane 22 and the second switch plane 24 in a predetermined sequence to facilitate fault detection. The cells that have been sent to crosspoints that have switch ports connected to them will be delivered to the connected switch ports.

Figure 2A:
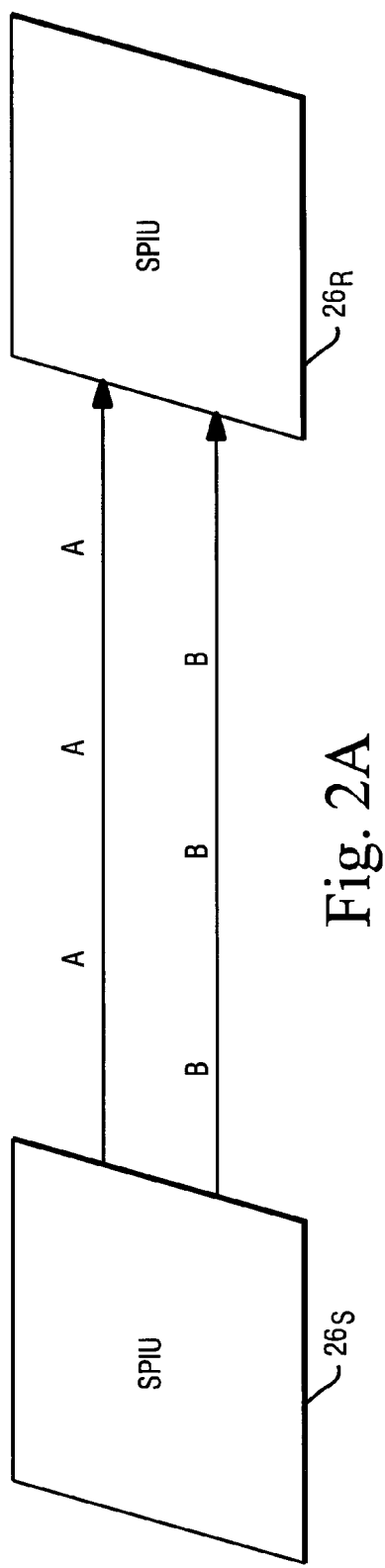
FIG. 2A is a diagrammatic view showing transmission of maintenance cells according to a mode of the present invention during normal operation of the node of FIG. 1.

In one mode of the invention, the predetermined sequence is an alternation of the maintenance cells. In this respect, in FIG. 2A the maintenance cells sent by sender switch port interface unit $26_S$ via first switch plane 22 are represented with the letter A while the maintenance cells sent by sender switch port interface unit $26_S$ via second switch plane 24 are represented with the letter B. FIG. 2A also shows that sender switch port interface unit $26_S$ sends the maintenance cells A, B in the predetermined sequence (e.g., alternation). Accordingly, for the normal operation scenario of FIG. 2A the receiver switch port interface unit $26_R$ receives the maintenance cells in the expected predetermined sequence (e.g., A,B,A, etc.).

Figure 2B:
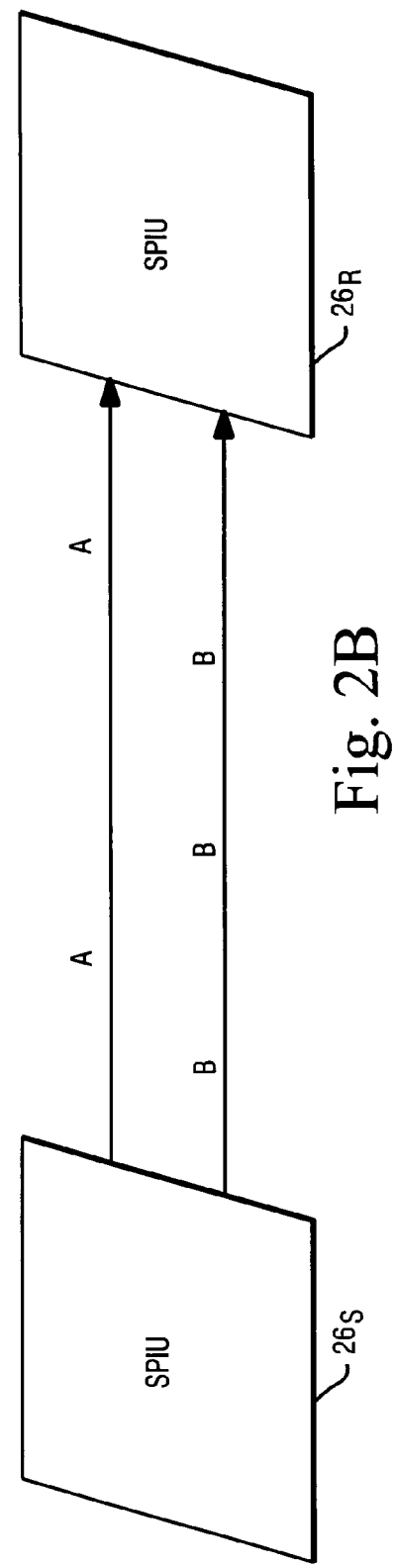
FIG. 2B is a diagrammatic view showing transmission of maintenance cells according to a mode of the present invention upon occurrence of a failure of a switch plane of the node of FIG. 1.

FIG. 2B shows a scenario in which first switch plane 22 fails, with the consequence that although sender switch port interface unit $26_S$ sends the maintenance cells in the same predetermined sequence as in FIG. 2A (A,B,A, etc.), the pattern of maintenance cells detected by receiver switch port interface unit $26_R$ is not the predetermined sequence. Rather, as shown in FIG. 2B, the receiver switch port interface unit $26_R$ detects the maintenance cells with the pattern A,B,B,A, B. In view of the fact that there is a break in the predetermined sequence of maintenance cells, receiver switch port interface unit $26_R$ concludes that the absence of a maintenance cell from first switch plane 22 indicates a failure of first switch plane 22. Thus, receiver switch port interface unit $26_R$ detects an erroneous or failed switch plane when the maintenance cells from the sender switch port interface unit do not arrive in the predetermined sequence.

Figure 3:
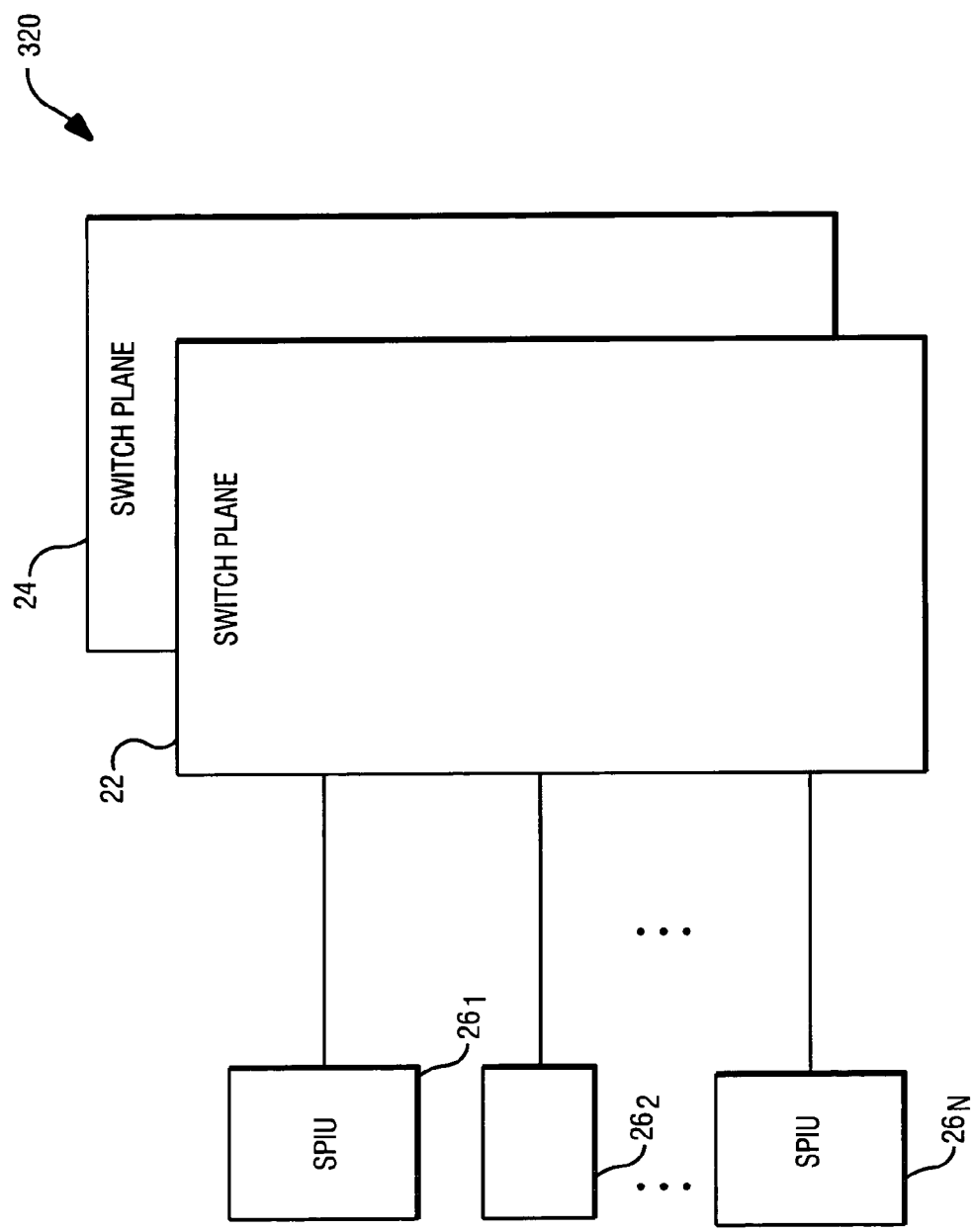
FIG. 3 is a schematic view of portions of a multi-plane, multi-switch port interface unit cell switching node according to an embodiment of the invention.

The foregoing figures and description have, for sake of simplicity, shown the switching node 20 as including only one sender switch port interface unit and one receiver switch port interface unit. As illustrated in FIG. 3, a typical switching node 320 has plural switch port interface units, such as sender switch port interface unit $26_1$ through $26_N$. In one example embodiment, the number of switch port interface units N is 64. Although each switch port interface unit functions dually as a sender switch port interface unit and a receiver switch port interface unit, the present discussion now concentrates on transmission of maintenance cells from just one switch port interface unit, in particular switch port interface unit $26_1$. Thus, in the ensuing discussion, switch port interface unit $26_1$ is considered to be the sender switch port interface unit $26_R$, and the remaining switch port interface units ($26_2$ through $26_N$) are considered to be the receiver switch port interface units relative to maintenance cells issued from sender switch port interface unit $26_R$.

Figure 4A:
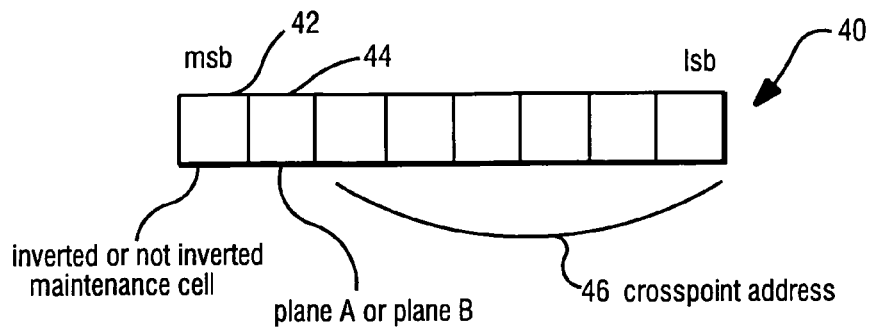
FIG. 4A is a diagrammatic view of an example format for a MPR register included in a switch port interface unit of the present invention.

Since the sender switch port interface unit $26_R$ is, in the switching node 320 of FIG. 3, sending maintenance cells to plural receiver switch port interface units, each maintenance cell must have, e.g., an address to specify the particular receiver switch port interface unit to which it is directed. In the example embodiments of the present invention, the address and various other information to be included in the maintenance cell is prepared in a register maintained by the sender switch port interface unit. FIG. 4A shows example contents of such a register 40, known as the maintenance pointer register (MPR register). The MPR register 40 is used to keep track of what cell type to send and to which address in which switch plane the maintenance cell is to be sent. The MPR register 40 has several fields, including inversion status bit 42; plane indicator bit 44; and crosspoint address field 46. In the illustrated embodiment, the inversion status bit 42 is the most significant bit, the plane indicator bit 44 is the second most significant bit, and the crosspoint address field 46 occupies the six least significant bits of register 40.

It is the crosspoint address field 46 which essentially serves as a receiver switch port interface unit address, since the crosspoint designated thereby indicates a corresponding switch port interface unit. The MPR register 40 is operated as a wrap-around counter, in which crosspoint address field 46 is incremented each time a maintenance cell is issued from the sender switch port interface unit.

The plane indicator bit 44 advises whether the maintenance cell is to be sent through first switch plane 22 or second switch plane 24. For example, if the plane indicator bit 44 is set to "0", the maintenance cell is to be sent through first switch plane 22. Conversely, if plane indicator bit 44 is set to "1", the maintenance cell is to be sent through second switch plane 24. The inversion status bit 42 of MPR register 40 indicates whether the payload of the maintenance cell to be generated is to be inverted or non-inverted.

When a maintenance cell is issued from sender switch port interface unit 26, the information maintained in MPR register 40 at that moment is included in the maintenance cell. Reference is again made to FIG. 4B(2) for the example contents of a maintenance cell 50 as including a maintenance cell header 51; inversion status (inv) bit 52; maintenance/initialization indicator (SMC/INI) 53; active switch plane indicator bit 54; destination/source address field 56; logic address field 57; payload 58; and parity bits 59. The parity bits 59 are four bits, each of the four parity bits being computed over a corresponding octet (the parity value for octet 4 also being calculated over the complete fourth octet). The payload 58 comprises a crosspoint test pattern.

In accordance with one aspect of the present invention, the sender switch port interface unit $26_R$ sends a cycle of maintenance cells, the cycle comprising plural sets of the predetermined sequence. In keeping with the provision of the inversion status (IS) bit 52, at least a portion of the maintenance cell of one of the sets of the cycle is inverted with respect to a corresponding portion of the maintenance cell of another of the sets of the cycle. That is, the payload of the inverted maintenance cell is the binary complement of the payload of the non-inverted maintenance cell.

Figure 5A:
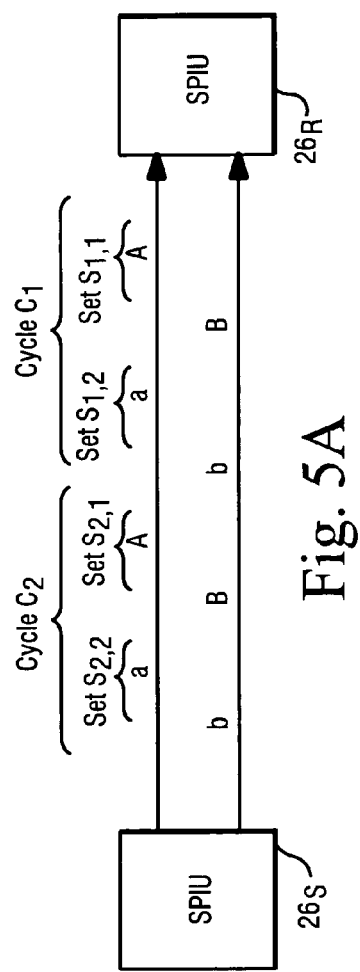
FIG. 5A and FIG. 5B are diagrammatic views showing transmission of cycles of maintenance cells according to one example mode of the present invention.

As one example of the cyclical aspect of the invention, each cycle issued comprises two sets of the predetermined sequence of maintenance cells. Such example is illustrated by FIG. 5A which, for sake of simplicity, again shows only two switch port interface units, i.e., sender switch port interface unit $26_S$ and receiver switch port interface unit $26_R$. FIG. 5A shows that, in normal operation, the maintenance cells are sent in cycles C, e.g., cycle $C_1$, cycle $C_2$, and so forth. Each cycle C has two sets S, particularly set $S_{1,1}$ and set $S_{1,2}$ for cycle $C_1$; set $S_{2,1}$ and set $S_{2,2}$ for cycle $C_2$; etc. Each set S includes the predetermined sequence of maintenance cells, e.g., for the illustrated embodiment, one maintenance cell from first switch plane 22 followed by one maintenance cell from second switch plane 24. In FIG. 5A, the maintenance cells from first switch plane 22 are illustrated as cells "A" when the cell is a non-inverted cell and as cells "a" when the cell is an inverted cell. In analogous manner, the maintenance cells from second switch plane 24 are illustrated as cells "B" when the cell is a non-inverted cell and as cells "b" when the cell is an inverted cell. As recalled from the foregoing, an "inverted cell" has the contents of its payload 57 inverted with respect to the payload 57 of a non-inverted cell. Thus, the maintenance cells issued in the following order from sender switch port interface unit $26_S$ to receiver switch port interface unit $26_R$: Cycle $C_1$ (A,B,a,b); Cycle $C_2$ (A,B,a,b); and so forth.

At the receiving switch port interface unit, the maintenance cells are checked for bit errors. The payload of the maintenance cells contain a known bit pattern designed to test the cross-point buffer RAMs of the switch core. The receiving switch port interface units check this pattern. The use of the inverted and non-inverted payload enable detection of stuck-at-one and stuck-at-zero conditions in the switch core crosspoint buffers. The receiving switch port interface unit also checks the parity of the cell header.

Figure 5B:
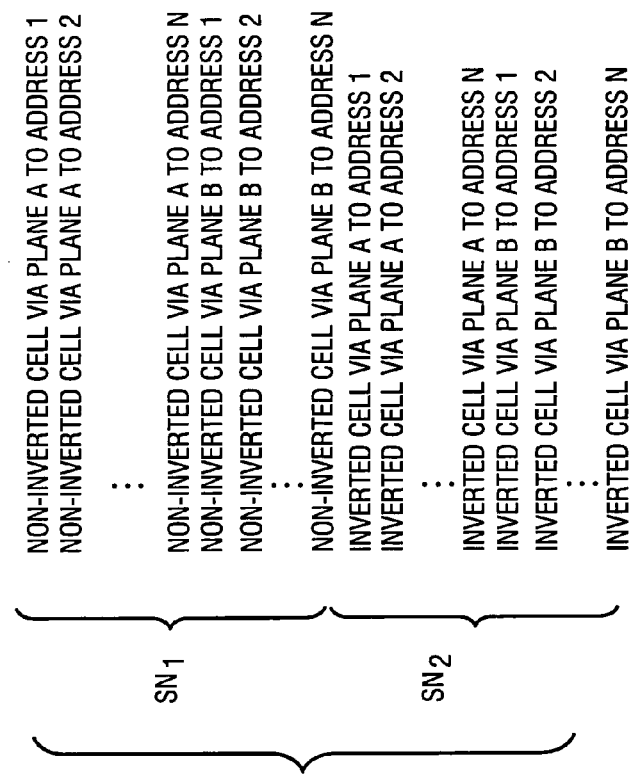

When there are N switch port interface units, each set SN of a cycle CN includes both a non-inverted maintenance cell and an inverted maintenance cell destined for each switch port interface unit. In other words, as illustrated in FIG. 5B, each cycle CN comprises two sets $SN_1$ and $SN_2$. The set $SN_1$ includes: (1) non-inverted maintenance cells sent via the first switch plane (plane A) to each of the N number of receiver switch port interface units; (2) non-inverted maintenance cells sent via the second switch plane (plane B) to each of the N number of receiver switch port interface units. The set $SN_2$ includes: (3) inverted maintenance cells sent via the first switch plane (plane A) to each of the N number of receiver switch port interface units; and (4) inverted maintenance cells sent via the second switch plane (plane B) to each of the N number of receiver switch port interface units.

Thus, in the cycle C of FIG. 5A and the cycle CN of FIG. 5B, it is seen that the predetermined sequence (e.g., the maintenance cells alternating between switch planes) is maintained. Accordingly, the receiver switch port interface unit $26_R$ is able to discern switch plane failure in the same manner as above described with reference to FIG. 2B, e.g., by detection of a maintenance cell dropped from the predetermined sequence by a faulty switch plane.

The foregoing describes cycles of maintenance cells issued by one sender switch port interface unit $26_S$. In actuality, each switch port interface unit sends cycles of maintenance cells in precisely the same manner as above described to the other switch port interface units of the switching node.

In the illustrated embodiment having N=64 switch port interface units, within a time period of 100 ms two complete cycles (each cycle having 256 maintenance cells) have been sent on each physical connection that connects the sender switch port interface unit $26_S$ to every other switch port interface unit. The nominal time between two consecutive cells is provided by a timer known as the maintenance cell timer (MCT timer).

The number of maintenance cells sent per cycle is reflected by Expression 1. The nominal time between two consecutive maintenance cells is 100 ms/256, or 0.39 ms.

$$2 \text{ celltypes} * 2 \text{ switch planes} * 64 \text{ switch port interface units} = 256 \quad \text{Expression 1}$$

The maintenance cells of the present invention are sent by sender switch port interface unit $26_S$ regardless of whether there is traffic on that physical connection or not. The sender switch port interface unit $26_S$ does not know whether there is a switch port interface unit connected at the core port specified by the crosspoint address, nor whether all N number of crosspoints actually exist. The maintenance cells of the present invention have a higher priority than any traffic cell selected for sending from the sender switch port interface unit to a crosspoint unit in the switch core (regardless of Quality of Service [QoS] of the traffic cell). A timer, known as the maintenance wait timer (MWT timer) is started when there is a request to send a maintenance cell to an occupied crosspoint buffer. If the MWT timer has expired, and the crosspoint buffer has still not been released, then the maintenance cell will be sent anyway.

For the most pessimistic case, the time that a maintenance cell has to wait can be calculated using Expression 2:

$$\text{TimeoutValue} = (\text{MaxBitsPerCell} \times \text{MaxNoOfCells}) / (\text{LowestBitRate}) \quad \text{Expression 2}$$

The MaxNoOfCells is the maximum number of cells that this maintenance cell has to wait before it can be sent. The most pessimistic value is 2*the maximum number of switch ports. For 388.8 Mbit/s (which is the lowest bit rate) 8*(64+6) bits/cell (including the row buffer release octets) and (2*64+4) cells (four extra cells times added to allow for the time it can take to send a PlusPrio cell and receive a RowBufferRelease cell), the time is 191 μs. This time is shorter than the time between maintenance cells which means that no queue is needed for the maintenance cells.

Given a maximum error detection time, the capacity reduction due to the maintenance cell load in the switch can be calculated with Expression 3.

$$\text{CapacityRed} = (\text{NoOfCellTypes} \times \text{NoOfSwitchPorts} \times \text{BitsPerMaintenanceCell}) / (\text{BitRate} \times \text{MaximumErrorDetectionTime}) \quad \text{Expression 3}$$

With the worst case specification, i.e., 100 ms maximum error detection time, 2 types of cells (inverted and non inverted), 64 switch ports, 8*(64+6) bits per maintenance cell and 388.8 Mbit/s bit rate, the capacity reduction is 0.19%.

Figure 6:
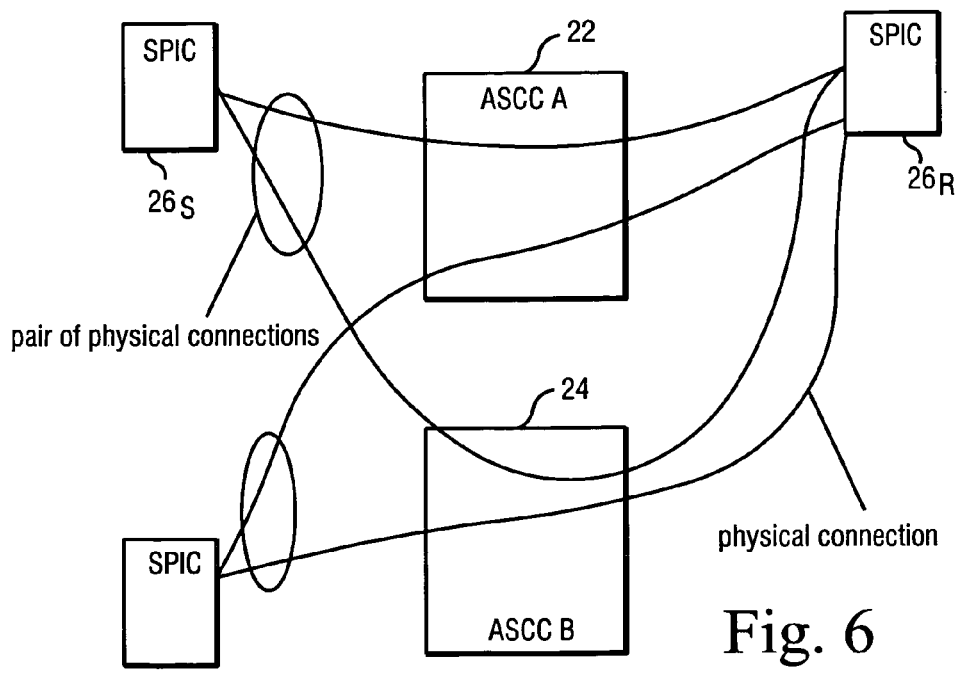
FIG. 6 is a diagrammatic view illustrating a physical connection and a pair of physical connections in a switching node of the present invention.

Thus, all physical connections through the first plane switch core 23 and the second plane switch core 25 are checked. As used herein, a physical connection is a unidirectional connection between a sender switch port interface unit and a receiver switch port interface unit. A pair of physical connections is two physical connections that has the same sender switch port interface unit and receiver switch port interface unit, with each of the physical connections of the pair running through different switch planes. FIG. 6 illustrates both a physical connection and a pair of physical connections.

At each receiver switch port interface unit $26_R$ there is a maintenance process which checks the incoming maintenance cells. The maintenance process checks for both corrupted and lost maintenance cells. Corrupted maintenance cells are detected by performing error checking on the cell using, e.g., cyclical redundancy check field 58. If a corrupted maintenance cell is detected, the switch plane from which is came is considered erroneous. Lost maintenance cells are detected in the manner of FIG. 2A and FIG. 2B, e.g., by checking whether arrival of the maintenance cells is in the predetermined sequence (e.g., in an illustrated embodiment, alternating between the switch planes for each pair of physical connections). If the predetermined sequence is not maintained, the switch plane which omitted a maintenance cell from the sequence is considered to be erroneous. That is, the switch plane where the maintenance cell got lost is considered to have failed.

Sending SPIC Information

The switch maintenance cells are not only used for error detection as above described, but also serve as carriers of information between switch port interface units (SPIC) 26. Three bits in the switch maintenance cell, illustrated in FIG. 4B(2), are used for this purpose. The SPIC_ASP bit is a copy of the ASP register in the switch port interface unit (SPIC) 26. The SPIC_plane_status_A and SPIC_plane_status_B bits reflect the opinion of the switch port interface unit (SPIC) 26 about first switch plane 22 and second switch plane 24. In this regard, The switch port interface unit (SPIC) 26 considers a switch plane as fully adequate if the following criteria are met: (1) the switch plane is configured; (2) the switch plane and the switch port have been in synchronization for a certain time; (3) no parity errors have occurred over a certain measured time in the SPAS transfer list; (4) no switch maintenance cells have been lost over a certain time; and (5) if a switch port interface unit (SPIC) 26 is forced to use a certain switch plane, it considers the passive switch plane as faulty.

When a switch port interface unit (SPIC) 26 detects errors according to criterion (2) and (3) in the preceding paragraph, switch port interface unit (SPIC) 26 provides a corresponding indication in the switch maintenance cells. This indication remains as long as the error remains and during four additional full switch maintenance cell send cycles.

Every time a switch maintenance cell or initialization cell arrives at a switch port interface unit (SPIC) 26, the register bit of the corresponding sending switch port interface unit (SPIC) 26 is set in the AMC register. The switch port interface unit (SPIC) 26 also updates the plane_status and SM_ASP_status bits with the information found in the SPIC_plane_status and SPIC_ASP bits in the switch maintenance cell.

Changing Active Switch Plane

Figure 7:
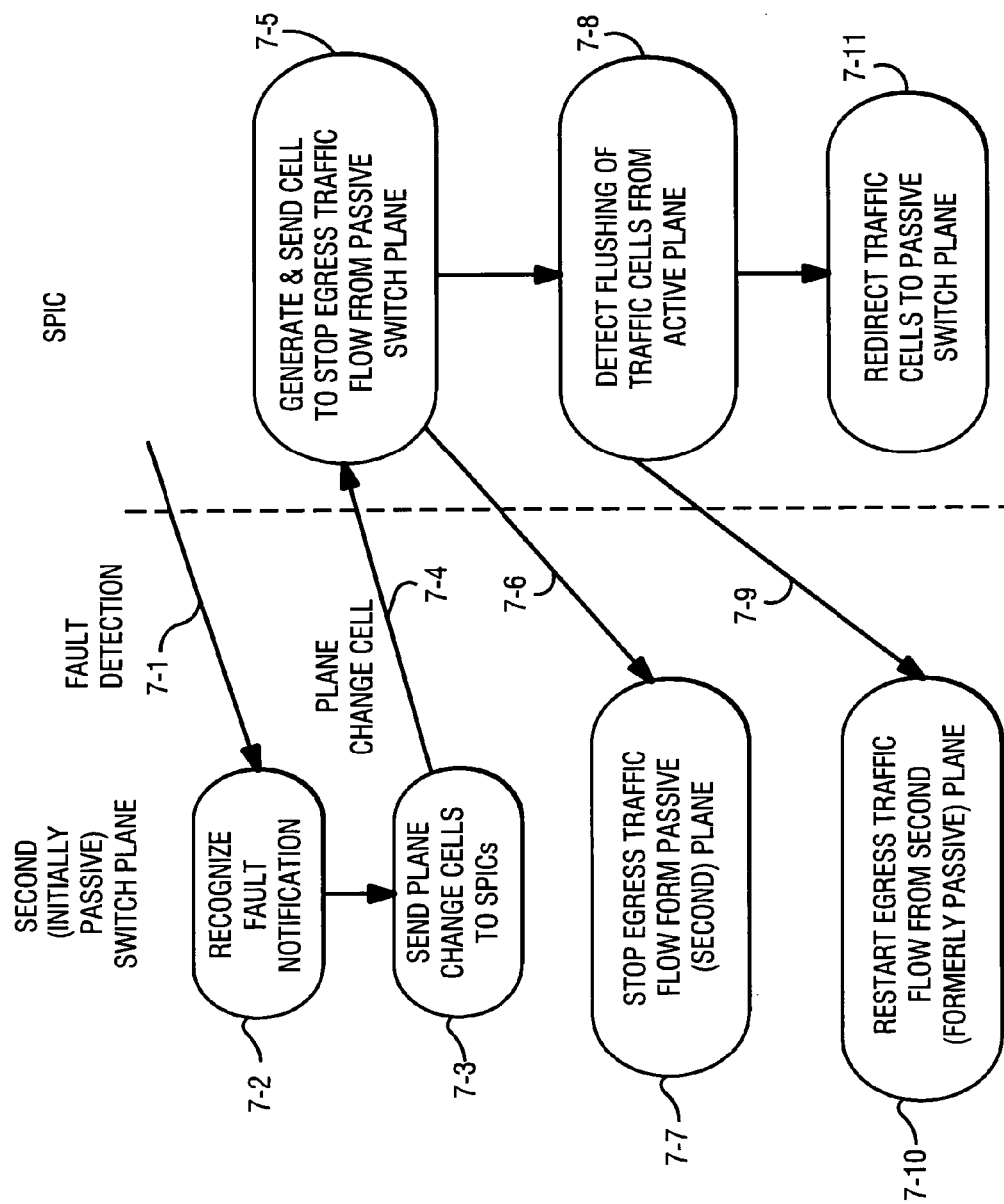
FIG. 7 is a diagrammatic view showing basic actions performed in a change of switch plane operation.

One scenario for detecting a faulty switch plane has been described in detail above (the scenario using switch maintenance cells). When a faulty switch plane has been detected using any of the four above-summarized error detection scenarios (including the scenario using switch maintenance cells), the switching node 20 next executes a change of switch plane operation. Basic actions performed in the change of switch plane operation are depicted in FIG. 7, which is below discussed in the context of the switching node 20 of the embodiment of FIG. 3. It is assumed in the ensuing discussion of FIG. 7 that a fault has been detected in first switch plane 22 (which has been serving as the active switch plane), and that second switch plane 24 has been serving as the passive switch plane. The objective of the change of switch plane operation of FIG. 7 is to reverse or change roles of the first switch plane 22 and the second switch plane 24, so that the second switch plane 24 becomes the active switch plane and first switch plane 22 becomes the passive switch plane.

The change of switch plane operation of FIG. 7 begins with a fault detection in the active switch plane, as represented by arrow 7-1 in FIG. 7. When the passive switch plane realizes that a fault has occurred in the active switch plane (action 7-2), the passive switch plane prepares plane change cells (action 7-3) which are sent to each of the switch port interface units (SPIC) 26 as action 7-4 (only one of the switch port interface units 26 being shown in FIG. 7). Upon receipt of the plane change cell of action 7-4, as action 7-5 each switch port interface unit (SPIC) 26 sends a cell to suspend egress of cells from the second (passive) switch plane so that the passive switch plane enters a blocked egress state 7-7. The sending of such a egress-suspending cell is indicated as action 7-6 in FIG. 7.

In view of the fact that the (now faulty) active switch plane likely still has some traffic cells destined to the switch port interface unit 26, the switch port interface unit 26 continues to receive traffic cells from the active switch plane until the switch port interface unit has detected (as action 7-8) that all traffic cells destined to it have been flushed from the active switch plane. Upon detecting the complete flushing of the active switch plane, as action 7-9 the switch port interface unit (SPIC) 26 sends a cell which notifies the second switch plane that egress traffic flow from the second switch plane can resume. Thus, at action 7-10, the second switch plane 24 begins to output cells.

The switch port interface units, in the meanwhile, as action, 7-11 redirect their outgoing traffic cells to the passive switch plane rather than to the active switch plane as formerly. Since the second switch plane is now permitted to transmit traffic cells, these traffic cells emanating from switch port interface units (SPIC) 26 are routed through the second switch plane. Thus, the change of active switch plane is completed.

FIG. 7 thus shows general actions involved in the change of switch plane operation. One particular implementation of the change of switch plane operation is now described and illustrated in FIG. 7A in conjunction with FIG. 10, and in the context of the particular switching node 820 shown in FIG. 8.

Figure 8:
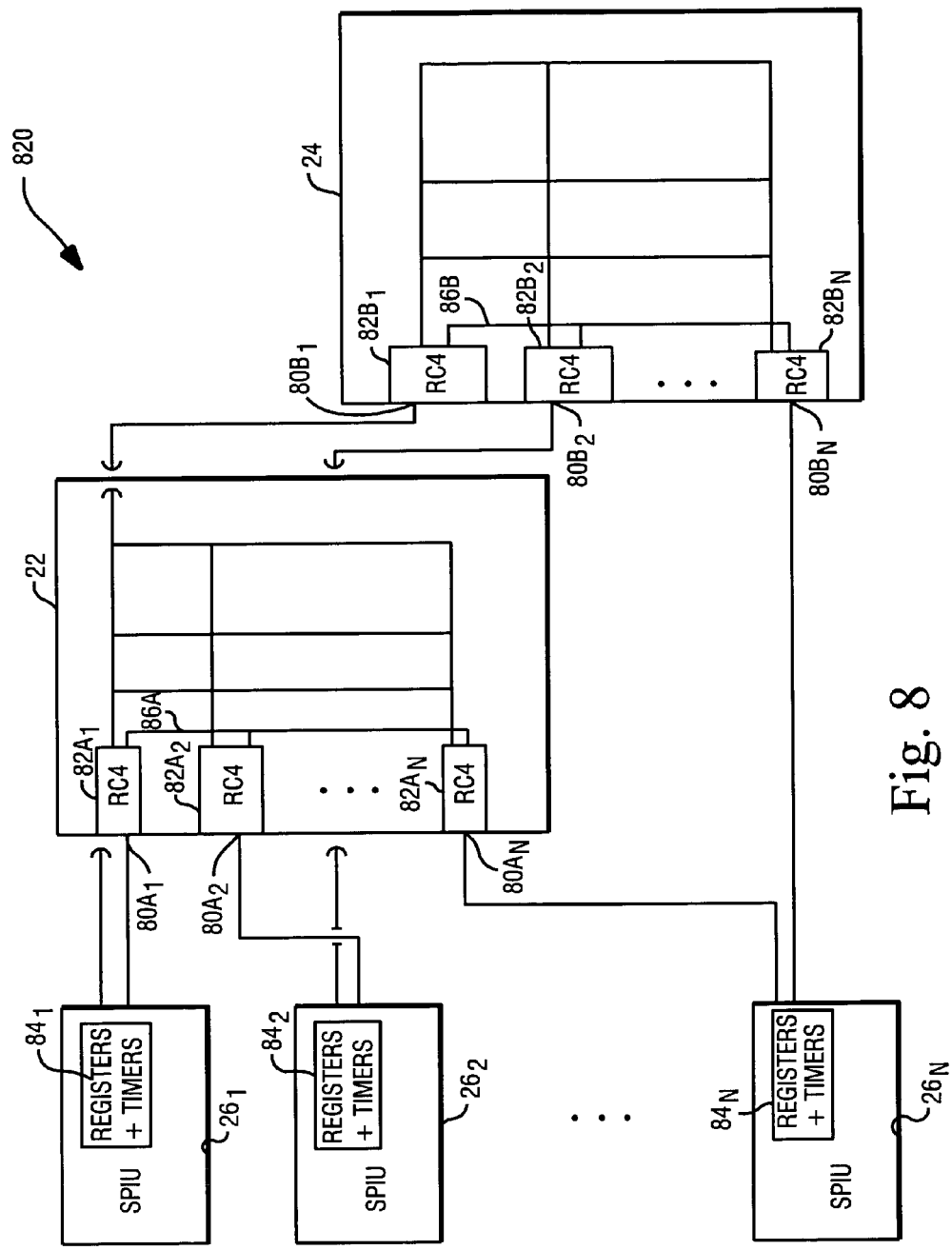
FIG. 8 is a schematic view of portions of a multi-plane, multi-switch port interface unit cell switching node according to an embodiment of the invention for illustrating the implementation of FIG. 7A.
Figure 9:
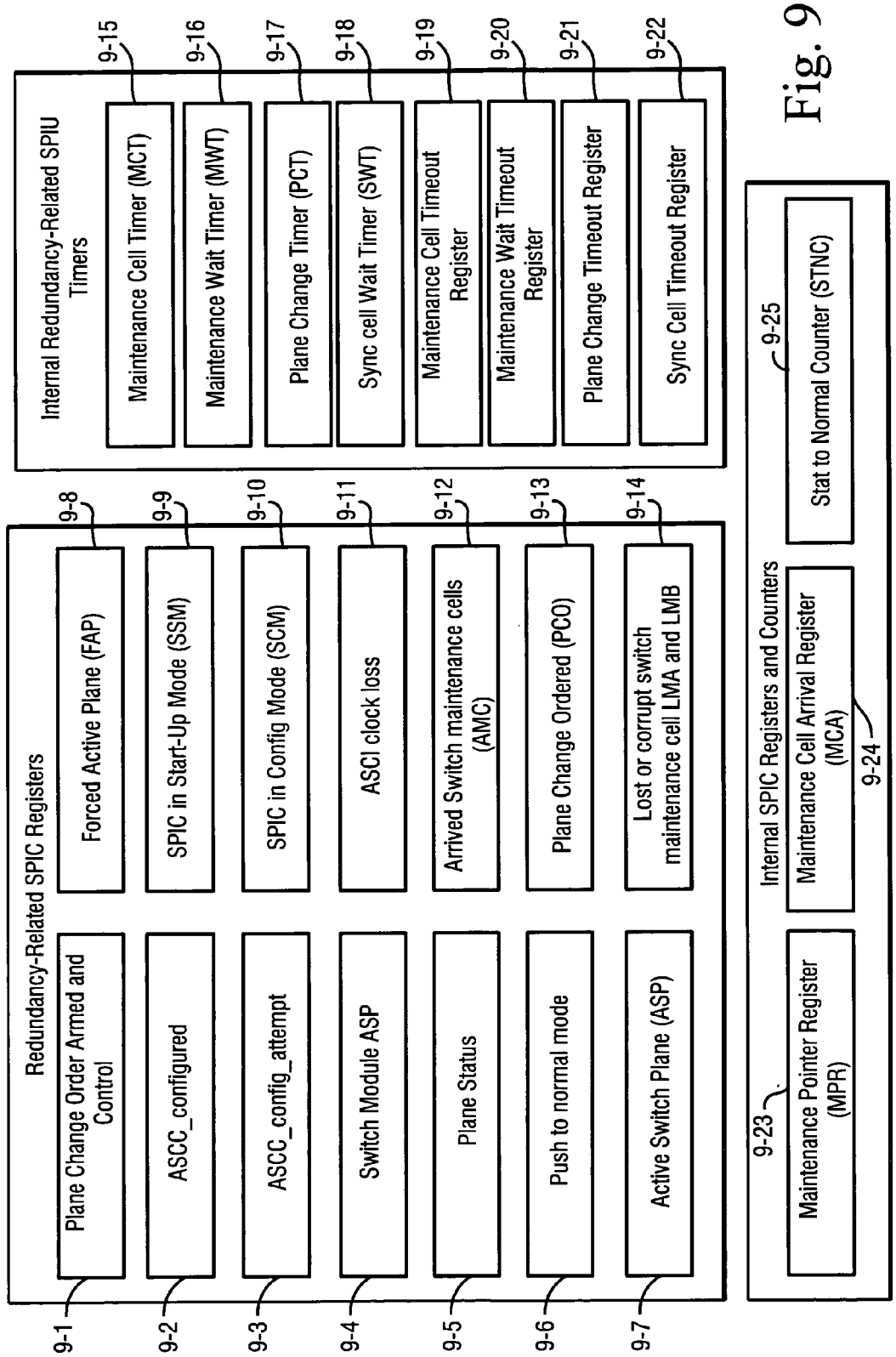
FIG. 9 is a diagrammatic view of a set of registers and timers included in a switch port interface unit according to the invention.

As in the embodiment of FIG. 3, the switching node 820 has first switch plane 22, second switch plane 24, and plural switch port interface units $26_1$–$26_N$. In switching node 820 of FIG. 8 each switch plane has both a switch core port 80 and a cell receiving unit (RCU) 82 associated with each switch port interface unit 26. For example, with reference to switch plane 22, which is also shown as the "A" switch plane, the switch port interface unit 26, is connected by a bidirectional link to switch core port 80A, through which cells are communicated to cell receiving unit (RCU) $82A_1$ (the cell receiving unit (RCU) $82A_1$ being thusly associated with switch port interface unit $26_1$). Similarly, with reference to switch plane 24, which is also shown as the "B" switch plane, the switch port interface unit $26_1$ is connected by a bidirectional link to switch core port $80B_1$ through which cells are communicated to cell receiving unit (RCU) $82B_1$ (the cell receiving unit (RCU) $82B_1$ being thusly associated with switch port interface unit $26_1$). Moreover, each switch port interface unit 26 has a set 84 of registers and timers, with various registers and timers of the set 84 being utilized in one or both of the switch plane fault detection and the change of switch plane operation. The contents of the set 84 of registers and timers is illustrated in FIG. 9, and described hereinafter.

Figure 7A:
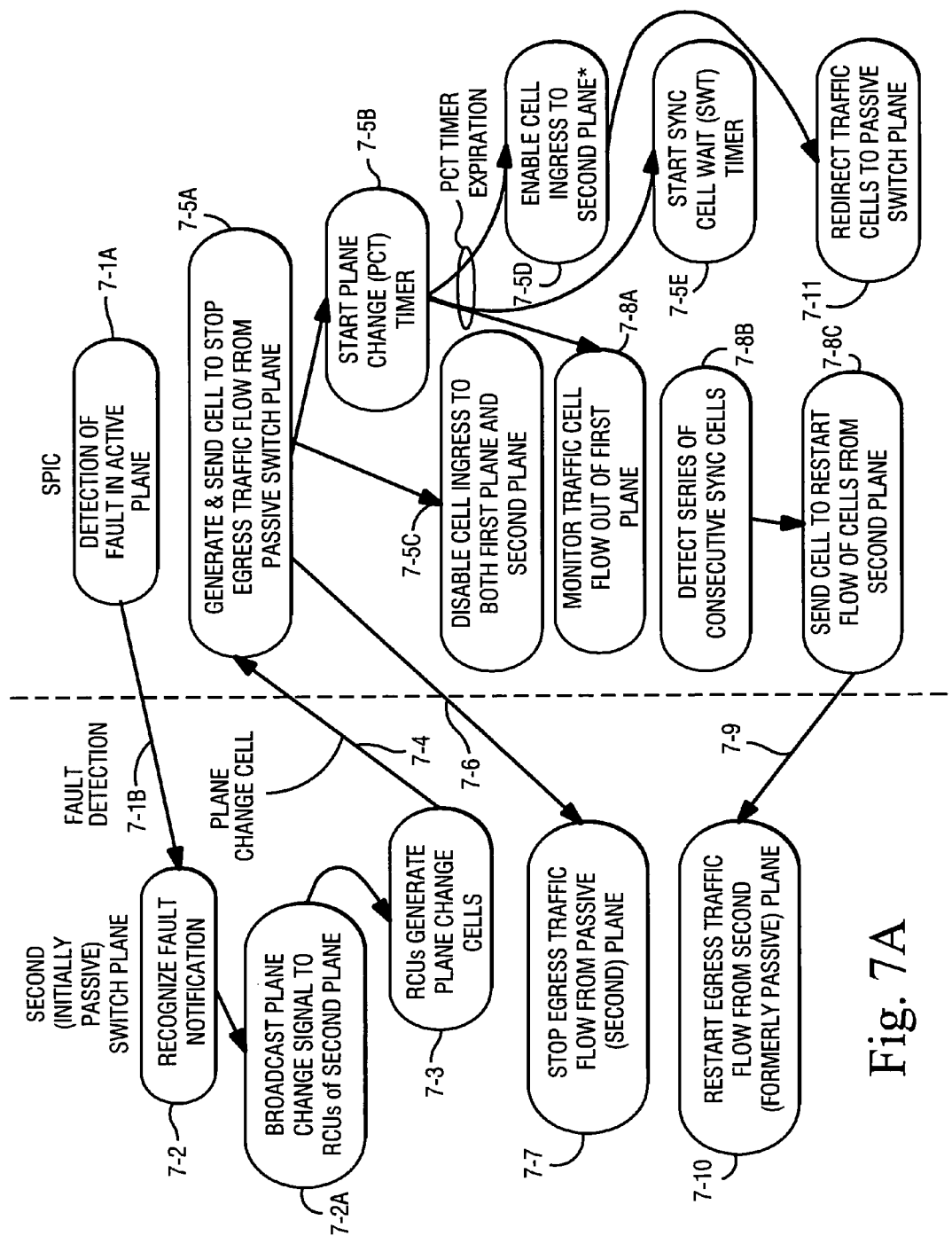
FIG. 7A is a diagrammatic view showing more detailed steps according to a particular implementation for the plane change operation of FIG. 7.

In the implementation of FIG. 7A, it is assumed that initially first switch plane 22 is the active switch plane and that second switch plane 24 is the passive switch plane. As described above in connection with the fault detection operation which utilizes a predetermined sequence of maintenance cells, in the FIG. 7A implementation it is one of the switch port interface units 26 which detects a fault in first (now active) switch plane 22, as indicated by action 7-1A. Upon such fault detection and provided that three conditions are satisfied, as action 7-1B the fault-detecting switch port interface unit 26 sends a fault detection cell to second (now passive) switch plane 24. The three conditions that must be satisfied before the sending of a fault detection cell are: (1) the second (passive) switch plane is in synchronization; (2) the passive plane has been configured; and (3) the error detecting receive unit is authorized to send a plane change cell (by the setting of a flag PC0_armed=true). The fault detection cell has a higher priority than the switch maintenance cells.

When second switch plane 24 recognizes (action 7-2) that a fault has occurred in first switch plane 22, as action 7-2A the second switch plane 24 broadcasts a plane change signal to each of the cell receiving units (RCUs) 82B of second switch plane 24. The plane change signal is carried on a signaling network 86B which connects all cell receiving units (RCUs) 82B of second switch plane 24.

Upon receipt of the plane change signal, each cell receiving unit (RCU) 82B of second switch plane 24 generates a plane change cell (action 7-3), and sends such plane change cell to its associated switch port interface unit 26 (action 7-4). When the plane change cell is received by the switch port interface unit 26 to which it is destined (see event 10-1 in FIG. 10), as action 7-5A the switch port interface unit (SPIC) 26 generates and sends to the second switch plane 24 a cell (known as the Egress_Traffic_Stop cell) which instructs the second switch plane 24 to stop egress of traffic flow from second switch plane 24 (see event 10-2 in FIG. 10). As action 7-5B, the switch port interface unit (SPIC) 26 starts the plane change timer (PCT) (see event 10-3 in FIG. 10). Further, as action 7-5C, switch port interface units (SPIC) 26 disable cell ingress from switch port interface unit (SPIC) 26 to both first switch plane 22 and second switch plane 24.

As long as the plane change timer (PCT) has not expired, ASCU ingress is disabled for both first switch plane 22 and second switch plane 24. This means that no traffic cells, switch maintenance cells, initialization cells, or plane change cells can be sent. The plane change timer (PCT) runs long enough to ensure that the slowest switch port interface units (SPIC) 26 have had time to receive the plane change cell and start their plane change process, e.g., stopped their ASCI ingress flows and sent an Egress_Traffic_Stop cell.

Three actions occur upon expiration of the plane change timer (PCT). Expiration of the plane change timer (PCT) is indicated as event 10-4 in FIG. 10. A first such action (action 7-5D) is that cell ingress is resumed. However, as further indicated by action 7-11, the traffic cell flow is now redirected to the former passive (now active) plane, i.e., second switch plane 24. As such, the switch maintenance cells should now have the new active plane indicated in their switch maintenance SPIC_ASP field.

Figure 10:
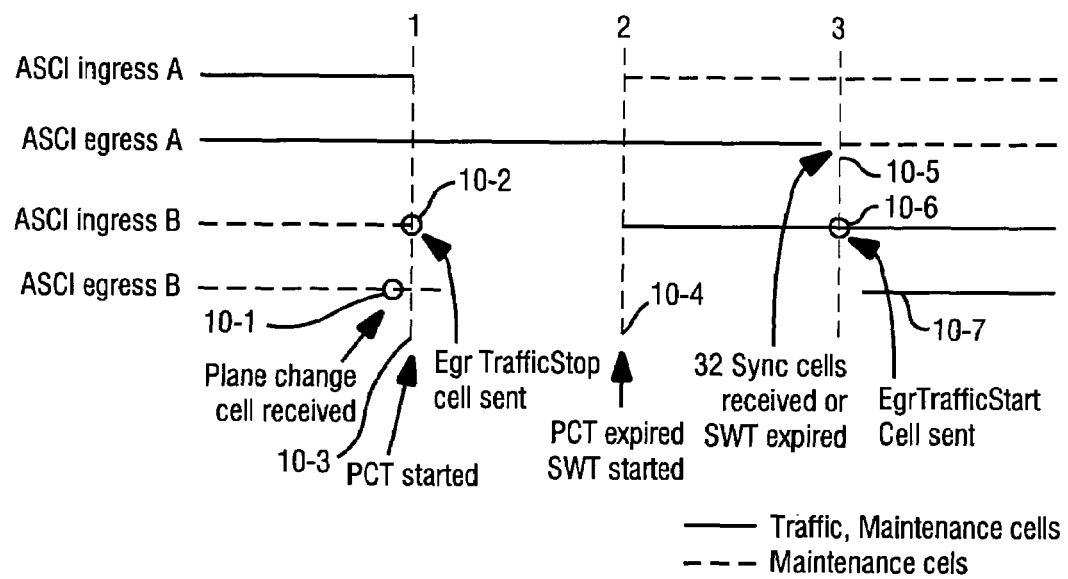
FIG. 10 is a diagrammatic view showing certain events involved in a plane change operation of FIG. 7A.

As a second action (action 7-5E) occurring upon expiration of the plane change timer (PCT), a synchronization cell wait timer (SWT) is started (at event 10-4 in FIG. 10).

As a third action (action 7-8A) occurring upon expiration of the plane change timer (PCT), the switch port interface unit (SPIC) 26 starts to monitor the traffic out of the previous active plane (e.g., first switch plane 22). When (as action 7-8B) a series of a first predetermined type of non-traffic cells are received from the ASCC egress, the first switch plane 22 is considered to be empty. In the illustrated embodiment, action 7-8B involves detecting thirty two consecutive synchronization cells. Upon detection of the series of action 7-8B (see event 10-5 in FIG. 10), as action 7-8C the switch port interface unit (SPIC) 26 sends a cell (known as the Egress_Traffic_Start cell) to second switch plane 24 to restart the flow of cells from second switch plane 24. Action 7-9 and event 10-6 reflect transmission of the Egress_Traffic_Start cell to second switch plane 24. Upon receipt of the Egress_Traffic_Start cell, as action 7-10 egress of traffic flow is restarted from the second switch plane 24 (see event 10-7 in FIG. 10). In this way, the sequential correctness in the cell flow at the receiving switch port interface units (SPIC) 26 is guaranteed, and traffic cells do not arrive simultaneously from both first switch plane 22 and second switch plane 24.

Thus, the detection of flushing of all traffic cells destined to it from first switch plane 22 by switch port interface unit 26 involves actions 7-7A through 7-7C in the FIG. 7A implementation. Since the actions of FIG. 7A are being performed by all other switch port interface units (since they also received plane change cells), all other switch port interface units are also sending synchronization cells to all other switch port interface units. When, at action 7-8B, it is determined that synchronization cells have been received from all other switch port interface units, as action 7-8C the switch port interface unit realizes that the first switch plane 22 has been fully flushed of all traffic cells headed to the switch port interface unit (so that no traffic cells will be lost or left in first switch plane 22 during the change of switch plane operation).

From the foregoing, it should be apparent that the switch port interface units (SPIC) 26 that are fast in the completion of the plane change process, and which already have enabled their ASCI egress on the new active plane, can therefore start to receive traffic cells from other fast SPICs without having to wait for slow switch port interface 5 units (SPIC) 26, thereby minimally disturbing traffic flow.

In the embodiment of FIG. 7A, the plane change timer (PCT) is set to have a predetermined time which is sufficiently long to ensure that the slowest switch port interface unit has had time to receive the plane change cell and to redirect traffic cells to the second switch plane.

All switch ports that receive a plane change cell will immediately lose their rights to send a plane change cell, i.e., the flag PCO_armed is set false to prevent oscillations between planes if there are multiple errors in the system.

During the plane change process and shortly thereafter, the switch port interface unit (SPIC) 26 will likely receive some switch maintenance cells with the ASP bit set to the old value. This will generate invalid SM status bits in the switch port interface units (SPIC) 26. This false indication of an error after plane change has to be taken into account.

If a plane change cell is received from an unconfigured plane, the plane change procedure is fully executed.

If, for some reason, a plane change cell arrives from the active switch plane rather than the passive switch plane, the switch port interface unit receiving the plane change cell will perform the change of switch plane operation, except that it will not change switch planes. In this situation, the switch port interface unit has to go through the change of switch plane operation since there might be other switch port interface units in the switch that actually do need to change plane.

Plane Change Timer (PCT)

The purpose with the PCT is to make sure that no traffic is sent to a plane while the intended receiver consider the plane as passive.

The expiration value for the PCT timer is calculated as the sum of each of (1)–(7) below:
(1) The maximum time difference in the signalling when the switch port internally broadcasts to a plane change to all RCUs.
(2) The maximum time difference between ASCC ports when they finish the current send cycle.
(3) The maximum time difference when sending plane change cell.
(4) The maximum time difference between SPICs when they receive and recognize the plane change order.
(5) The maximum time difference between SPICs when they finish the current send cycle.
(6) The maximum time difference between SPICs when sending EgrTrafficStop cell.
(7) The maximum time difference between RCUs when stopping traffic in the egress port.

Assuming all cells are equally large and maximum differences internally in SPIC and ASCC is 0.5 cell send cycle gives:
0.5+1+0.5+0.5+2+0.5+0.5=5.5 cell cycles.

With cell size 64 octets and a lowest bit rate of 388.8 Mbit/s that corresponds to (5.5*64*8/388.8) ≈7 µs.

SYNC Cell Wait Timer (SWT)

The expiration value for the SWT timer is calculated as the sum of (1) the time it takes to empty the crosspoint buffer column in ASCC, and (2) the time it takes to send row buffer release cells between each traffic cell. Thus, for (64 traffic cells+64 rbr cells)=(64*64+64*6) octets=4480 octets, with a 16 bit data bus it will be 2240 clock cycles, independent of clock speed. SWT will have following values dependent of SAI clock speed.

If 48.6 Mhz clock is used, SWT=Number of clock cycles/frequency=2240/48.6 Mhz=47 µs If 24.3 Mhz clock is used, SWT=Number of clock cycles/frequency=2240/24.3 Mhz=93 µs.

Switch Port Modes

The switch port interface units 26 of the present invention basically function in the modes illustrated in FIG. 11. As mentioned previously, these modes include the configuration mode 11-1; start-up_A mode 11-2A (for first switch plane 22); start-up_B mode 11-2B (for second switch plane 24); normal_A mode 11-3A (for first switch plane 22); normal_B mode 11-3B (for second switch plane 24), forced_A mode 11-4A (for first switch plane 22); and forced_B mode 11-4B (for second switch plane 22).

The purpose for the configuration mode 11-1 is to give SPAS-SW time to perform necessary configurations of registers in the two switch planes and the SPIC before SPIC starts to send cells through the switch cores. The configuration mode 11-1 is entered after hardware reset. In configuration mode 11-1 a switch port interface unit (SPIC) 26 will not send any traffic/switch maintenance/initialization or internally generated ASCU_mgmt cells over ASCI ingress plane A or plane B. Only ASCU_mgmt cells from SPAS-SW can be sent over ASCI ingress. Over ASCI egress every received cell, except for the ASCU_mgmt cells that are sent to the SPAS-SW, are discarded. Plane change cells should not start any plane change mechanism in the SPIC. The configuration of a switch port is finalized by setting the ASCC_config_attempt register. If no ASCI_clock_loss is indicated the corresponding switch plane, ASCC_configured bit is set to true. After SPAS-SW has finished the configuration of the registers, the SPAS-SW must send a SPI-U_mgmt cell to set the SCM (SPIC_in_Config_Mode) register to the value config_ready. SPIC will then enter the start-up mode. It is possible for SPAS-SW to set the SCM register to the value config_mode at any time.

The start-up mode 11-2 is entered when start-up mode force_active_plane is set to redundancy_auto, then SCM is set to config_ready. There are five purposes for the start-up mode 11-2:

1. To decide active switch plane by checking the SPI-C_ASP bit in the received maintenance cells. The SPIC changes from startup A to startup B if any received maintenance cell indicates that its sender has the B plane as active switch plane, and vice versa. If no switch maintenance cells are received, plane A will be considered as active plane.
2. To adapt to the switch maintenance cell sending order of the other switch port interface units (SPIC) 26 by setting the MCA register correctly.
3. To send initialization cells to make it possible for other switch port interface units (SPIC) 26 to set their MCA registers correctly before they start checking for lost maintenance cells from this SPIC.
4. To identify the Switch Module status (This means that the SPIC in start-up mode monitors the incoming maintenance cells from SPICs in normal mode. Two things are checked: (a) if any switch port interface unit (SPIC) 26 in normal mode indicates that it consider a switch plane as faulty, or (b) switch port interface units (SPIC) 26 in normal mode are having different active switch plane. If any of these states are found the plane change order mechanism will be disabled (PCO_armed=false)).
5. To synchronize the row buffer status information in the switch port interface unit (SPIC) 26 with the actual status in the cross points in the switch ports.

In the start-up mode, only presync, sync, plusPrio, ASCU management and initialisation cells can be sent over ASCI ingress. No traffic cells, maintenance cells, or plane change cells will be sent.

Traffic cells received at ASCI egress are discarded, but embedded row buffer release information have to be used to update the row buffer status information in the SPIC. ASCU management cells are sent to SPAS-SW as in normal mode. Arriving switch maintenance cells and initialization cells are used only for updating the MCA register. Plane change orders are carried out.

Before putting itself into normal mode 11-3, the switch port sends at least two cycles of initialization cells, i.e. 512 cells. This is controlled by a cell counter called STNC, Start-up to Normal Counter. The counter is started first when the startup-mode is entered. The timer is restarted every time when a switch maintenance cell is received in which the SPIC_ASP bit does not indicate the same active plane as the previously received maintenance cell. The timer is also restarted if a plane change cell is received. When the conditions are stable, the timer will eventually expire and the normal mode 11-3 will then be entered. In the special case where the timer never reaches its end value because it is repeatedly restarted, the normal mode 11-3 will never be entered.

The normal mode 11-3 occurs when the switch port is up and running and traffic cells can be transmitted and received. No traffic, switch maintenance, or initialiation cells should be transmitted to unconfigured switch planes (although cells can be received). During plane change the traffic is turned off, as previously described (see FIG. 7 and FIG. 7A). During normal mode 11-3 the switch port continuously checks the status of the active plane. If the PCO_armed register is set (sending plane change order is allowed). the switch port will send a plane change order cell if any of the following errors are detected on the active plane: (1) ASCC out of sync; (2) SPIC out of sync; (3) parity errors in the received cells; (4) erroneous or missing redundancy switch maintenance cells. When the switch port receives a plane change cell in normal mode the plane change process is started, as previously described.

The switch port interface unit (SPIC) 26 can be forced to Forced Active Plane Mode 11-4 (e.g., Forced_A or Forced_B mode) in systems where the redundancy mechanism is not used. The switch port interface unit (SPIC) 26 can only be set to forced mode from configuration mode 11-1. This is done by setting the force_active_plane to forced_A or forced_B and after that leaving configuration mode 11-1. Then the switch port interface unit (SPIC) 26 will use the indicated switch plane as its active switch plane. In this mode switch port interface unit (SPIC) 26 will not send any plane change cells or react to any incoming plane change cells. This means that the switch plane redundancy function is turned off. The switch maintenance cells should be sent as in normal mode with the switch plane not active marked as faulty. The ASP register will show the plane to which the SPIC is forced as active plane.

In both start-up mode 11-2 and normal mode 11-3 the switch port interface unit (SPIC) 26 has to monitor the incoming switch maintenance cells. Information in these cells are used for updating the AMC and the SM status register. If the incoming switch maintenance cells indicate that SPICs have different planes as active or that one or more SPICs have problem with at least one switch plane, the plane change order mechanism should be deactivated immediately, i.e. PCO_armed=false.

If the switch port interface unit (SPIC) 26 detects an ASCI_clock_loss the SPIC should set the corresponding ASCC_configured=false. This will give the SPAS-SW a mechanism for detecting new switch planes in the system. The SPAS-SW will then configure the ASCC port and acknowledge this to the SPIC.

Switch Port Interface Units: Status Registers and Timers

The timers and registers in set 84 of switch port interface unit (SPIC) 26, illustrated in FIG. 9, are discussed briefly below.

Plane Change Order Armed and Control register 9-1: The SPAS-SW can order the switch port interface unit (SPIC) 26 to activate the plane change mechanism by writing "activate" ('1') to the Plane Change Order Control, PCOC, bit. If the switch port interface unit (SPIC) 26 activates the plane change order mechanism it sets the Plane Change Status, PCO_armed, bit to "true" ('1'). Deactivation is done by writing "deactivate" ('0') to the PCOC register. The plane change order mechanism can only be activated by SPAS-SW if the SPIC's SM status bits indicates that all SPICs can run traffic through any plane and that all planes have the same active plane. If any of these conditions should not be fulfilled at any moment, if a plane change cell is detected, or the SPIC sends a plane change cell the plane change order mechanism should be deactivated, i.e. PCO_armed="false" ('0'). The plane change mechanism can only be reactivated by SPAS-SW by writing "activate" in the PCOC register. Note that it is not the value '1' in the PCOC register that activates the plane change mechanism, it is the write action combined with the necessary conditions for the setting of the PCO_armed "true" as stated previously. The PCOC is a control bit. The SW can only write to the register. The PCO_armed is a status bit and should be reset to false. The status bit can only be read by software.

ASCC configured registers 9-2 and ASCC_config_attempt register 9-3: Together these registers have four bits totally, including two status bits ASCC_configured_A and ASCC_configured_B and two control bitsASCC_config attempt_A and ASCC_config_attempt_B. The switch port interface unit (SPIC) 26 has to know when an ASCC is configured and ready to receive cells without risking loss of cells. An ASCC is considered to be ready to receive cells when its corresponding ASCC_configured=true ('1'). The SW confirms that the ASCC is configured to the SPIC by writing to the related ASCC_config_attempt register. If the related ASCI_clock_loss status register indicates that the clock is present, the ASCC_configured register is set to "true". If an error occur which sets the ASCI_clock_loss, the SPIC will set the ASCC_configured register to "false". There are three states a SPIC can consider an ASCC to be in: No clock, clock and config. If the SPIC has an ASCI clock and the SW writes to ASCC_config_attempt, the SPIC consider the ASCC as configured. It is not the value '1' in the ASCC_config_attempt register that sets the ASCC_configured bits, it is the write action combined with the necessary conditions for the setting of the ASCC_configured "true" as stated previously. ASCC_config_attempt='0' has no meaning and should not affect any status bit. ASCC_config_attempt_A and ASCC_config_attempt_B are both control registers that are only writable. ASCC_configured_A and ASCC_configured_B are both readable only status bits and should be reset to false.

Switch Module ASP register 9-4: The SM bits are compiled from corresponding bits in the switch maintenance cells. If the maintenance cell's SPIC_ASP indicates that the transmitting cell has ASP=A, then SM_ASP_status_A is set ('1'). If the maintenance cell's SPIC_ASP indicates that the transmitting cell has ASP=B, then SM_ASP_status_B is set ('1'). Note that the values in the SM_ASP is latched, i.e. the register value contains information measured from the last reset. This might lead to false error indications during plane change, for instance. After SW has reset the register, the register will not be updated correctly until after 25 ms. The registers are read and reset to '0' by SPAS-SW. Reset value is '0'.

Plane status register 9-5: The plane status register 9-5 is actually two 64 bit registers, namely Plane_status_A and Plane_status_B. These registers are updated with information extracted from the maintenance cells SPIC_plane_status bits. A high level in a register position indicates that at least one switch maintenance cell with a '1' in the plane status field has been received from the corresponding SPIC. The values in the plane_status register are latched. i.e. the register value contains information measured from the last reset. This might lead to false error indications during plane change, for instance. After SW has reset the register, the register will not be updated correctly until after 25 ms. The registers are read and reset to '0' by SPAS-SW. The reset value is '0'.

Push to normal mode register 9-6: The normal mode register 9-6 is a one bit register. Writing '1' to the push_to_normal_mode register forces the SPIC to Normal_A mode. This should only be possible from startup mode. The register has no meaning when the SPIC is in normal mode or forced. A transition from startup to normal mode caused by SW push should not lead to any error indications in maintenance cell supervising mechanisms. This register is only writable. Writing '0' is not considered as valid.

Active Switch Plane (ASP) register 9-7: The Active Switch Plane (ASP) register 9-7 is a one bit register, specifying what switch plane is active. The register is set to "plane A" ('0') after reset. The register can only be read, not written to or reset, by SPAS-SW. The switch port uses this register to determine in what switch plane it shall send and receive traffic cells. During plane change the SPIC will send and receive traffic from different planes. The value of the ASP register is therefore not defined during plane change.

Forced Active Plane register 9-8. The Forced Active Plane register 9-8 is a two bit register used by the SPAS-SW to decide what mode the SPIC will run in after leaving config mode. The register is set to "redundancy_auto" ('00') after reset which will take the SPIC to startup mode when ordered to leave config mode. The register can be read and written to by SPAS-SW but should not influence the SPIC when the SPIC is in startup or normal mode. If the register is set to "forced_A" ('10') or "forced_B "('11'), then the SPIC will be forced to plane A or B when leaving config mode. When the SPIC is forced to the A or B plane the register value 'Ox' is an invalid value that shall be considered the same as no change in state.

SPIC in Start-up Mode (SSM) register 9-9: The SPIC in Start-up Mode (SSM) register 9-9 is a one bit register showing whether SPIC is in normal or forced mode ('0'), or start-up or config mode ('1'). The register can be read, but not set/reset, by SPAS-SW. If SPAS-SW sets SCM to config mode this register will indirectly be set to start- up mode 11-2 by SPIC.

SPIC in Config Mode (SCM) register 9-10: The SPIC in Config Mode (SCM) register 9-10 is a one bit register. The register is set to "config_mode" ('1') after reset. The value is '0' in all other modes. The register can be read and written to by SPAS- SW.

ASCI clock loss register 9-11: The ASCI clock loss register 9-11 is a two bit register. The register indicates a loss of clock in the ASCI egress interface. A high value indicates that the SPIC has lost the clock at least once since reset. The register can only be read and reset by SPAS-SW.

Arrived switch Maintenance Cells (AMC) 9-12: The Arrived switch Maintenance Cells (AMC) 9-12 is a 64 bit register. A bit is set when a switch maintenance cell or an initialisation cell has arrived from the corresponding switch port at any switch plane. All bits in the registers are set to zero after reset. By reading and resetting this register, the SPAS-SW can perform measurements to check which SPICs that are connected. SPAS-SW can read and reset the register.

Plane Change Ordered (PCO) register 9-13: The Plane Change Ordered (PCO) register 9-13 is a one bit register. If the register is set to "pcq_sent" ('1') it indicates that this switch port has initiated a change of active switch plane (has sent a plane change cell). The register can be read and reset by SPAS-SW. Lost or corrupt switch maintenance cell (LMA and LMB) registers 9-14: The lost or corrupt switch maintenance cell (LMA and LMB) registers 9-14 are two 64 bits registers. Example of usage: if SPIC considers a switch maintenance cell to be corrupt or missing from plane B, sent from SPIC x, bit x will be set in the LMB register. The register can be read and reset by SPAS-SW.

The redundancy related SPIU timers 9-15 through 9-22 listed below are required for the implementation of the redundancy handling. The timers themselves cannot be accessed (read, written to or reset) by SPAS-SW. The expiration time for the timers can however be configured by SPIU_mgmt cells from SPAS-SW.

Maintenance Cell Timer (MCT) 9-15: The Maintenance Cell Timer (MCT) 9-15 expires when it is time to send the next switch maintenance cell or initialisation cell. The timer is restarted as soon as it has expired. The expiration value can be configured with the Maintenance Cell Timeout Register 9-19.

Maintenance Wait Timer (MWT) 9-16: If a crosspoint. is occupied when it is time to send a switch maintenance cell or initialisation cell, the Maintenance Wait Timer (MWT) 9-16 is started. When it expires the cell will be sent even if the crosspoint still is occupied. The expiration value can be configured with the Maintenance Wait Timeout Register 9-20.

Plane Change Timer (PCT) 9-17: The Plane Change Timer (PCT) 9-17 is used during the plane change process. When this timer is running no cells, except sync and presync cells, may be sent in ASCI ingress in any plane. The expiration value can be configured with the Plane Change Timeout Register 9-21.

Sync cell Wait Timer (SWT) 9-18: The Sync cell Wait Timer (SWT) 9-18 is used during the plane change process. The timer indicates for how long time a SPIC shall wait until all the crosspoint column buffers in the former active ASCC with certainty have been unloaded. The expiration value can be configured with the Sync cell Wait Timeout Register 9-22.

Maintenance Cell Timeout Register 9-19: The value of the Maintenance Cell Timeout Register 9-19 decides when the Maintenance Cell Timer 9-15 shall expire, and therefore when it is time to send a new switch maintenance/initialisation cell. The register can be read and written by SPAS-SW. After reset the register shall have a default value. The resolution in the register is 1 μs.

Maintenance Wait Timeout Register 9-20: The value of the Maintenance Wait Timeout Register 9-20 decides when the switch maintenance Wait Timer 9-16 shall expire, and therefore for how long SPIC shall wait before sending a switch maintenance/initialisation cell to an occupied crosspoint buffer. The register can be read and written by SPAS-SW. After reset the register shall have a default value. The resolution in the register is 1 μs.

Plane Change Timeout Register 9-21: The value of the Plane Change Timeout Register 9-21 decides when the Plane Change Timer 9-17 shall expire. The register can be read and written by SPAS-SW. After reset the register shall have a default value. The resolution in the register is 1 μs.

Sync cell Wait Timeout Register 9-22: The value of the Sync cell Wait Timeout Register 9-22 register decides when the Sync cell Wait Timer 9-18 shall expire. The register can be read and written by SPAS-SW. After reset the register shall have a default value. The resolution in the register is 1 μs.

Maintenance Pointer Register (MPR) 9-23: The Maintenance Pointer Register (MPR) 9-23 is an eight bit register which indicates which type of maintenance cell shall be generated. A zero indicates a maintenance cell with a non-inverted payload bit pattern; a one indicates a maintenance cell with inverted payload bit pattern. The most significant-1 bit indicates a switch plane. A zero MSB indicates plane A; a one indicates plane B. The six least significant bits indicate a destination switch port (0-63). The MPR is operated as an incrementing wrap-around counter. The register is incremented each time a maintenance cell is sent.

Maintenance Cell Arrival Register (MCA) 9-24: The Maintenance Cell Arrival Register (MCA) 9-24 is a 64 bit register which represents a pair of physical connections through the switch. A bit is set to zero each time a maintenance cell arrives from switch plane A over the corresponding pair of physical connections. A bit is set to one each time a maintenance cell or an initialization cell arrives from switch plane B over the corresponding pair of physical connections. The MCA is used to determine whether a maintenance cell has been lost or not. Suppose, for example, that a maintenance cell arrives from the same switch plane as the preceding maintenance cell over the same pair of physical connections. In such case the maintenance cell has been lost since the maintenance cells are sent in alternating switch planes for a certain pair of physical connections. The Maintenance Cell Arrival Register (MCA) 9-24 only generates errors in the Forced Active Plane Mode 11-4 or the normal mode 11-3.

Start to Normal Counter (STNC) 9-25: The Start to Normal Counter (STNC) 9-25 is used to determine the transition between start-up mode 11-2 and normal mode 11-3. When this counter expires the switch port interface unit (SPIC) 26 will change from the start-up mode 11-2 to the normal mode 11-3. It is reset at plane change orders or when the switch port interface unit (SPIC) 26 changes from startup_A to startup_B mode, or vice versa.

SPIC Cell Handling

Figure 12:
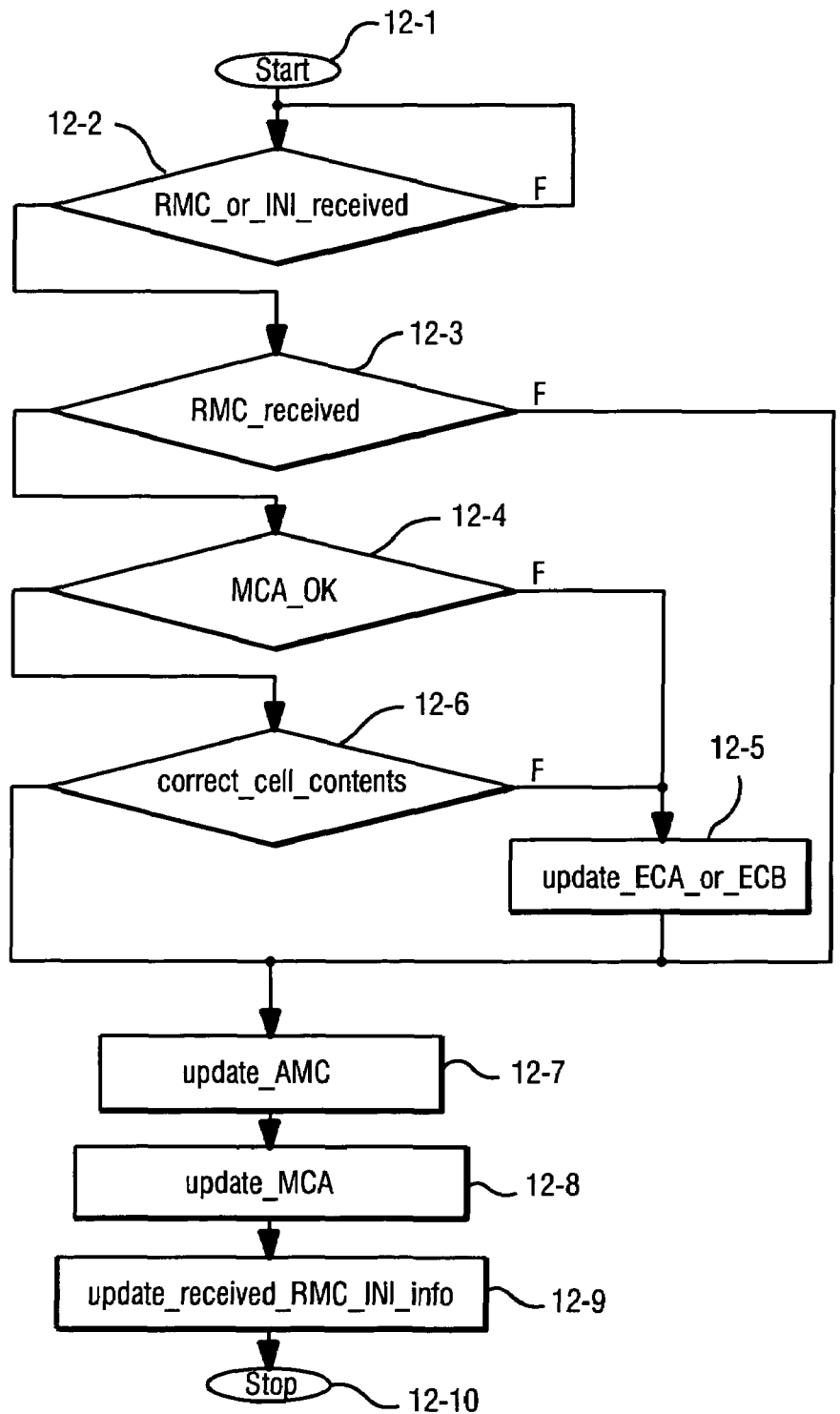
FIG. 12 is a flowchart showing basic steps involved in receiving maintenance cells at a receiver switch port interface unit in accordance with a mode of the invention.

FIG. 12 shows example basic steps involved in a maintenance cell-handling procedure performed by a switch port interface unit. After the maintenance cell-handling procedure has begun (step 12-1), the arriving cell is checked at step 12-2 to determine whether it is one of a maintenance cell or an initialization cell. Other types of cells are ignored by the maintenance cell-handling procedure. Assuming that the arriving cell is one of a maintenance cell or an initialization cell, at step 12-3 the maintenance cell-handling procedure determines whether the arriving cell is a maintenance cell. If so, the maintenance cell-handling procedure checks the order of arrival of the arriving maintenance cell at step 12-4 by checking the Maintenance Cell Arrival Register (MCA). In this regard, the MCA is used to determine whether a maintenance cell has been lost or not. Suppose, for example, that a maintenance cell arrives from the same switch plane as the preceding maintenance cell over the same pair of physical connections. In such case the maintenance cell has been lost since the maintenance cells are sent in alternating switch planes for a certain pair of physical connections.

If the arriving maintenance cell is not in the correct order of the predetermined sequence (see FIG. 2, for example), at step 12-5 the maintenance cell-handling procedure updates one of the Erroneous Cell Counters (ECA and ECB), as appropriate, depending from which switch plane the maintenance cell arrived. The Erroneous Cell Counters (ECA and ECB) count discarded cells, erroneous maintenance cells, and lost maintenance cells.

Upon an affirmative determination of step 12-4, at step 12-5 the maintenance cell-handling procedure determines whether the arriving maintenance cell has the correct cell contents, e.g., whether the arriving maintenance cell has proper integrity based on its parity values. If not, step 12-5 is performed for updating either the ECA or ECB counter.

After an affirmative determination of step 12-6, or after updating the ECA or ECB counter of step 12-5, at step 12-7 the Arrive Maintenance Cells (AMC) is updated. As explained previously the AMC is a 64 bit register which is set when a maintenance cell or an initialization cell has arrived from the bit-corresponding switch port interface unit. Then, as step 12-8, the maintenance cell-handling procedure updates the Maintenance Cell Arrival Register (MCA). As mentioned before, the MCA is a 64 bit register which represents a pair of physical connections through the switch. A bit is set to zero each time a maintenance cell arrives from switch plane A over the corresponding pair of physical connections. A bit is set to one each time a maintenance cell or an initialization cell arrives from switch plane B over the corresponding pair of physical connections. Then, at step 12-9, a sixty four bit register containing information on which ports are generating initialization or maintenance cells towards the receiving port is updated. by reading this register it is thus possible from the receiving port to see which other ports are present in the system.

Switch Core

Details of one example implementation of switch core with its cell receiving units (RCUs) utilized for the present invention, including the first plane switch core 23 and the second plane switch core 25, are understood with reference to U.S. patent application Ser. No. 09/188,101, entitled "Asynchronous Transfer Mode Switch", and U.S. patent application Ser. No. 09/188,265, entitled "Asynchronous Transfer Mode Switch", both of which are incorporated herein by reference.

Utilization in Telecommunications Node

Figure 13:
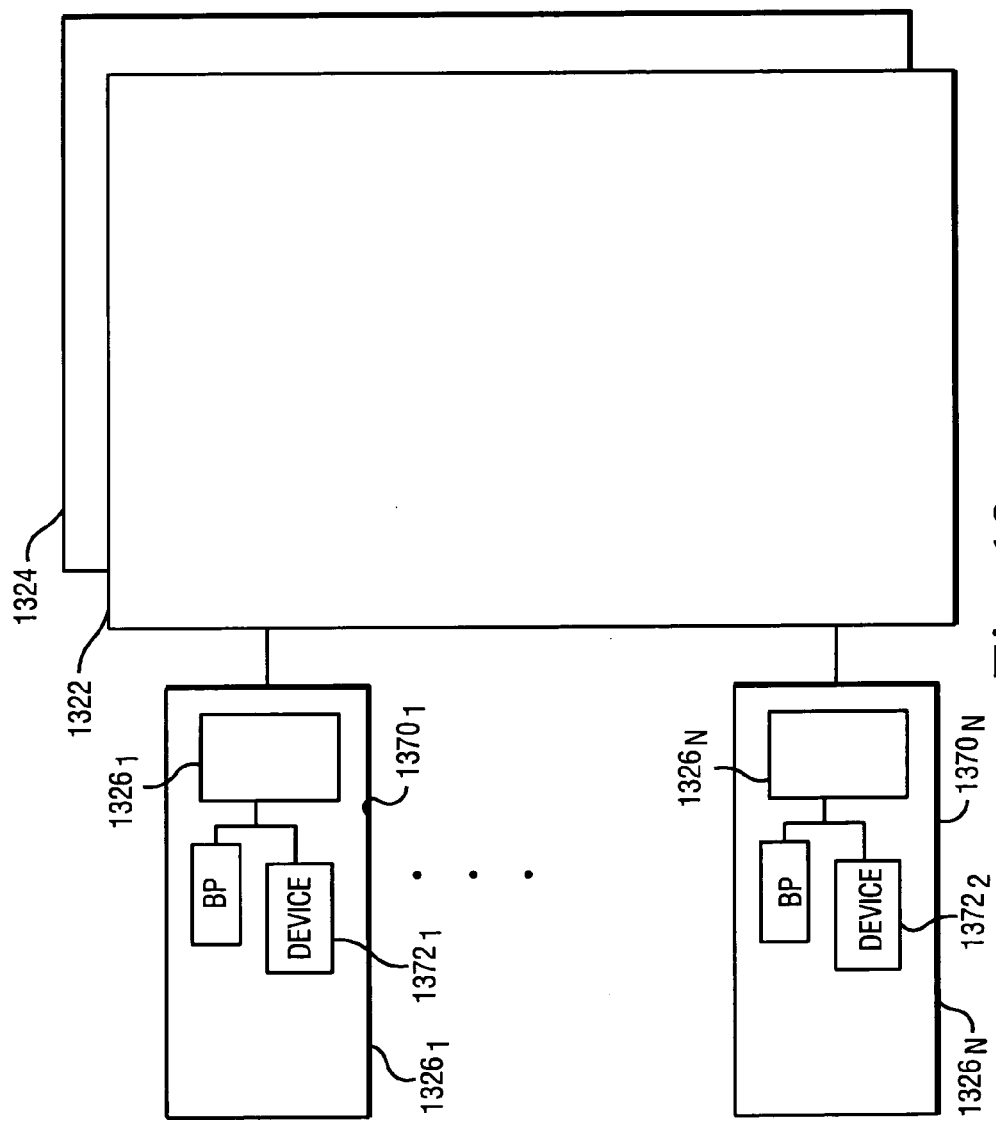
FIG. 13 is a schematic view of portions of a multi-plane, multi-switch port interface unit cell switching node according to an embodiment of the invention illustrated in the context of a node of a telecommunications system.

FIG. 13 shows an implementation of the present invention in a node 1320 having first switch plane 1322; second switch plane 1324; and switch port interface units $26_1$–$26_N$. Each of the switch port interface units 26 is mounted on a device board 1370, device boards 1370, through $1370_N$ being shown for the mounting of respective switch port interface units $26_1$–$26_N$ On the side of each switch port interface unit opposite the switch core, each switch port interface unit is connected by a bus or the like to one or more devices. In the illustration of FIG. 13, each device board 1370 has a respective board processor BP as one of its devices, and another device 1372. The devices 1372 can be, for example, exchange terminals handling a link that connects the node to the remainder of a network, e.g., to another cell switch node. The implementation of FIG. 13 can be utilized for a node of a telecommunications system 18, such as a base station node or a radio network controller (RNC) node [also known as a base station controller (BSC) node]. Examples of usage of such device boards are found in the following United States Patent applications (all of which are incorporated herein by reference): U.S. patent application Ser. No. 09/188,102, entitled "Asynchronous Transfer Mode System Handling Differing AAL Protocols"; U.S. patent application Ser. No. 09/188,097, entitled "Centralized Queuing for ATM Node"; U.S. patent application Ser. No. 09/188,340, entitled "Cell Handling Unit and Method for ATM Node"; U.S. patent application Ser. No. 09/188,347, entitled "ATM Time-Stamped Queuing"; U.S. patent application Ser. No. 09/188,344, entitled "Coordinated Cell Discharge From ATM Queue"; and, U.S. patent application Ser. No. 09/188,096, entitled "Combined Header Parameter Table for ATM Node". Preferably, but not exclusively, the cells utilized by present invention are ATM cells.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a multi-plane cell switching node, the cell switching node having a first switch plane; a second switch plane; and plural switch port interface units; the method comprising:

in response to detection of a fault in the first switch plane, the second switch plane;

sending plane change cells to the plural switch port interface units;

stopping egress traffic flow from the second switch plane;

in response to receipt of the plane change cells, redirecting traffic cells sent by the plural switch port interface units from the first switch plane to the second switch plane;

determining when traffic cells destined to a particular switch port interface unit have been flushed from the first switch plane; and thereafter starting the egress traffic flow from the second switch plane to the particular switch port interface unit;

wherein a fault-detecting switch port interface unit sends a fault detection cell to the second switch plane upon detection of a fault in the first switch plane;

wherein in response to the receipt of the fault detection cell, the second switch plane sends a broadcast plane change signal to plural cell receiving units of the second switch plane, the plural cell receiving units corresponding to the plural switch port interface units, and wherein the plural cell receiving units generate the plane change cells for sending to the respective plural switch port interface units.

2. A method of operating a multi-plane cell switching node, the cell switching node having a first switch plane; a second switch plane; and plural switch port interface units; the method comprising:

in response to detection of a fault in the first switch plane, the second switch plane:

sending plane change cells to the plural switch port interface units;

stopping egress traffic flow from the second switch plane;

in response to receipt of the plane change cells, redirecting traffic cells sent by the plural switch port interface units from the first switch plane to the second switch plane;

determining when traffic cells destined to a particular switch port interface unit have been flushed from the first switch plane; and thereafter starting the egress traffic flow from the second switch plane to the particular switch port interface unit;

the step of sending the plane change cells to the plural switch port interface units occurring in response to the second switch plane sending a broadcast plane change signal to plural cell receiving units of the second switch plane, the plural cell receiving units corresponding to the plural switch port interface units, and generating at the plural cell receiving units the plane change cells for sending to the respective plural switch port interface units.

3. The method of claim 2, further comprising a fault-detecting switch port interface unit sending a fault detection cell to the second switch plane upon detection of a fault in the first switch plane.

4. The method of claim 2, wherein the step of determining when traffic cells have been flushed from the first switch plane comprises:
   sending first predetermined non-traffic cells from the plural switch port interface units to the first switch plane;
   in accordance with receipt of the first predetermined non-traffic cells via the first switch plane at a particular switch port interface unit, sending a second predetermined non-traffic cell from the particular switch port interface unit to the second switch plane; and
   wherein the step of starting the egress traffic flow from the second switch plane to the particular switch port interface unit is performed upon reception of the second predetermined non-traffic cell from the particular switch port interface unit at the second switch plane.

5. The method of claim 4, wherein the first predetermined non-traffic cells are synchronization cells.

6. The method of claim 4, wherein the second predetermined non-traffic cell is a management cell.

7. The method of claim 2, further comprising stopping ingress of cells to the first switch plane and the second switch plane until expiration of a predetermined time.

8. The method of claim 7, further comprising setting the predetermined time sufficiently long to ensure that the slowest switch port interface unit has had time to receive its plane change cell and to redirect traffic cells to the second switch plane.

9. The method of claim 2, wherein prior to the fault detection the first switch plane serves as an active switch plane and the second switch plane serves as a passive switch plane.

10. A method of operating a multi-plane cell switching node, the cell switching node having a first switch plane; a second switch plane; and plural switch port inter ace units; the method comprising:
   a fault-detecting switch port interface unit sending a fault detection cell to the second switch plane upon detection of a fault in the first switch plane;
   in response to receipt of the fault detection cell, the second switch plane:
      sending plane change cells to the plural switch port interface units;
      stopping egress traffic flow in the second switch plane;
   in response to receipt of the plane change cells, redirecting traffic cells sent from the plural switch port interface units from the first switch plane to the second switch plane;
   sending first predetermined non-traffic cells from the plural switch port interface units to the first switch plane;
   in accordance with receipt of the first predetermined non-traffic cells via the first switch plane at a particular switch port interface unit, sending a second predetermined non-traffic cell from the particular switch port interface unit to the second switch plane;
   using the second predetermined non-traffic cell to start egress flow of cells from the second switch plan to the particular switch port interface unit;
   wherein in response to the receipt of the fault detection cell, the second switch plane sends a broadcast lane change signal to plural cell receiving units of the second switch plane, the plural cell receiving units corresponding to the plural switch port interface units, and wherein the plural cell receiving units generate the plane change cells for sending to the respective plural switch port interface units.

11. The method of claim 10, further comprising stopping ingress of cells to the first switch plane and the second switch plane until expiration of a predetermined time.

12. The method of claim 11, further comprising setting the predetermined time sufficiently long to ensure that the slowest switch port interface unit has had time to receive its plane change cell and to redirect traffic cells to the second switch plane.

13. The method of claim 10, wherein prior to the fault detection the first switch plane serves as an active switch plane and the second switch plane serves as a passive switch plane.

14. A multi-plane cell switching node comprising:
   a first switch plane;
   plural switch port interface units;
   a second switch plane which, in response to detection of a fault in the first switch plane, stops egress traffic flow from the second switch plane and sends plane change cells to the plural switch port interface units;
   wherein, in response to receipt of the plane change cells, the switch port interface units redirect traffic cells to the second switch plane and, upon determining when traffic cells have been flushed on the first switch plane; send an egress traffic flow-staring cell to the second switch plane;
   a fault-detecting switch port interface unit which sends a fault detection cell to the second switch plane upon detection of a fault in the first switch plane;
   plural cell receiving units of the second switch plane, the plural cell receiving units corresponding to the plural switch port interface units, and wherein in response to the receipt of the fault detection cell, the second switch plane sends a broadcast plane change signal to the plural cell receiving units, and in response the plural cell receiving units generate the plane change cells for sending to the respective plural switch port interface units.

15. A multi-plane cell switching node comprising:
   a first switch plane;
   plural switch port interface units;
   a second switch plane which, in response to detection of a fault in the first switch plane, stops egress traffic flow from the second switch plane and sends a plane change cells the plural switch port interface units;
   wherein, in response to receipt of the plane change cells, the switch port interface units redirect traffic cells to the second switch plane and, upon determining when traffic cells have been flushed from the first switch plane; send an egress traffic flow-starting cell to the second switch plane;
   plural cell receiving units of the second switch plane, the plural cell receiving units corresponding to the plural switch port interface units, and wherein the second switch plane sends the plane change cells to the plural switch port interface units in response to the second switch plane sending a broadcast plane change signal to the plural cell receiving units of the second switch plane, and wherein the plural cell receiving units generate the plane change cells for sending to the respective plural switch port interface units.

16. The apparatus of claim 15, further comprising a fault detecting switch port interface unit which sends a fault detection cell to the second switch plane upon detection of a fault in the first switch plane.

17. The apparatus of claim 15, wherein the plural switch port interface units send first predetermined non-traffic cells through the first switch plane and detect reception of the first predetermined non-traffic cells from the first switch plane, whereupon the switch port interface units send a second predetermined non-traffic cell to the second switch plane; and wherein the second switch plane starts the egress traffic flow from the second and switch plane to the respective switch port interface units upon reception of the second predetermined non-traffic cell at the second switch plane.

18. The apparatus of claim 17, wherein the first predetermined non-traffic cells are synchronization cells.

19. The apparatus of claim 17, wherein the second predetermined non-traffic cell is a management cell.

20. The apparatus of claim 15, wherein the second switch plane stops ingress of cells to the first switch plane and the second switch plane until expiration of a predetermined time.

21. The apparatus of claim 20, wherein the predetermined time is set sufficiently long to ensure that the slowest switch port interface unit has had time to receive the plane change cells and to redirect traffic to the second switch plane.

22. The apparatus of claim 15, wherein prior to the fault detection the first switch plane serves as an active switch plane and the second switch plane serves as a passive switch plane.

* * * * *